US009544848B2

(12) United States Patent
Jafarian et al.

(10) Patent No.: US 9,544,848 B2
(45) Date of Patent: Jan. 10, 2017

(54) METHODS AND APPARATUS FOR COMMUNICATING SHORT PAGING MESSAGES IN A WIRELESS COMMUNICATION NETWORK

(71) Applicant: Qualcomm Incorporated, San Diego, CA (US)

(72) Inventors: Amin Jafarian, San Diego, CA (US); Simone Merlin, San Diego, CA (US); Gwendolyn Denise Barriac, Encinitas, CA (US); Bin Tian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 380 days.

(21) Appl. No.: 13/911,862

(22) Filed: Jun. 6, 2013

(65) Prior Publication Data
US 2014/0112226 A1 Apr. 24, 2014

Related U.S. Application Data

(60) Provisional application No. 61/718,052, filed on Oct. 24, 2012, provisional application No. 61/719,355, filed on Oct. 26, 2012, provisional application No. 61/759,356, filed on Jan. 31, 2013.

(51) Int. Cl.
*H04W 52/02* (2009.01)
*H04B 1/3805* (2015.01)

(52) U.S. Cl.
CPC ..... *H04W 52/0225* (2013.01); *H04W 52/0229* (2013.01); *H04B 1/3805* (2013.01); *Y02B 60/50* (2013.01)

(58) Field of Classification Search
None
See application file for complete search history.

(56) References Cited

U.S. PATENT DOCUMENTS

| 5,754,069 | A | 5/1998 | Nagaraj |
| 6,075,994 | A | 6/2000 | Bhat |
| 6,215,980 | B1 | 4/2001 | Kim |
| 6,990,362 | B2 | 1/2006 | Simpson et al. |
| 8,311,053 | B2 | 11/2012 | Choi |
| 2005/0037781 | A1 | 2/2005 | Ozugur et al. |
| 2005/0186973 | A1 | 8/2005 | Gaal et al. |

(Continued)

FOREIGN PATENT DOCUMENTS

EP 2273828 B1 1/2012

OTHER PUBLICATIONS

International Search Report and Written Opinion—PCT/US2013/064110—ISA/EPO—Jan. 28, 2014.

*Primary Examiner* — Yemane Mesfin
*Assistant Examiner* — Jeff Banthrongsack
(74) *Attorney, Agent, or Firm* — Knobbe Martens Olson & Bear, LLP

(57) ABSTRACT

Systems, methods, and devices for communicating data in a wireless communications network are described herein. In some aspects, a wireless device includes a first receiver and a second receiver. The second receiver may be configured to consume less power than the first receiver. The second receiver receives a second signal wherein the second signal comprises a wake-up signal configured in NDP format including a signal field. The wireless device includes a circuit configured to take at least one action based on the second signal.

83 Claims, 26 Drawing Sheets

(56) References Cited

U.S. PATENT DOCUMENTS

| | | |
|---|---|---|
| 2007/0008915 A1 | 1/2007 | Kim et al. |
| 2007/0149257 A1 | 6/2007 | Cheresh et al. |
| 2008/0095268 A1 | 4/2008 | Aldana |
| 2008/0146253 A1* | 6/2008 | Wentink ............ H04W 52/0216 455/458 |
| 2008/0181154 A1 | 7/2008 | Sherman |
| 2008/0181155 A1* | 7/2008 | Sherman ............ H04W 52/0229 370/311 |
| 2009/0003252 A1 | 1/2009 | Salomone et al. |
| 2010/0003935 A1 | 1/2010 | Behzad et al. |
| 2010/0061326 A1 | 3/2010 | Lee et al. |
| 2010/0142426 A1 | 6/2010 | Taniuchi et al. |
| 2010/0167686 A1 | 7/2010 | Pan |
| 2010/0190514 A1 | 7/2010 | Laroia et al. |
| 2011/0128947 A1* | 6/2011 | Liu ................... H04L 25/03343 370/338 |
| 2011/0211511 A1 | 9/2011 | Bakthavathsalu et al. |
| 2011/0263214 A1* | 10/2011 | Robinson ............... H04B 1/006 455/88 |
| 2011/0274021 A1 | 11/2011 | He et al. |
| 2011/0305217 A1* | 12/2011 | Seok ....................... H04L 47/10 370/329 |
| 2012/0106423 A1 | 5/2012 | Nylander et al. |
| 2012/0120859 A1 | 5/2012 | Stephens et al. |
| 2012/0250731 A1 | 10/2012 | Taghavi Nasrabadi et al. |
| 2012/0294218 A1 | 11/2012 | Lee et al. |
| 2013/0223305 A1 | 8/2013 | Doppler et al. |
| 2013/0223419 A1* | 8/2013 | Ghosh ............... H04W 52/0235 370/338 |
| 2014/0029494 A1 | 1/2014 | Sundaram et al. |
| 2014/0112266 A1 | 4/2014 | Seok |
| 2014/0120962 A1 | 5/2014 | Merlin et al. |

* cited by examiner

METHODS AND APPARATUS FOR COMMUNICATING SHORT PAGING MESSAGES IN A WIRELESS COMMUNICATION NETWORK

CLAIM OF PRIORITY UNDER 35 U.S.C. §119

The present application for patent claims priority to Provisional Application No. 61/718,052 entitled "NEAR PASSIVE RECEIVERS WITH REGULAR PS MODE AND NO ULP (AP IS NOT AWARE OF THE RECEIVER/CIRCUIT MODE)" filed Oct. 24, 2012, and assigned to the assignee hereof and hereby expressly incorporated by reference herein, and to Provisional Application No. 61/719,355 entitled "NEAR PASSIVE RECEIVERS WITH REGULAR PS MODE AND NO ULP (AP IS NOT AWARE OF THE RECEIVER/CIRCUIT MODE)" filed Oct. 26, 2012, and assigned to the assignee hereof and hereby expressly incorporated by reference herein, and to Provisional Application No. 61/759,356 entitled "NEAR PASSIVE RECEIVERS WITH REGULAR PS MODE AND NO ULP (AP IS NOT AWARE OF THE RECEIVER/CIRCUIT MODE)" filed Jan. 31, 2013, and assigned to the assignee hereof and hereby expressly incorporated by reference herein.

BACKGROUND

Field

The present application relates generally to wireless communications, and more specifically to systems, methods, and devices for communicating very short paging messages for wireless receivers.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The receivers in a wireless network may consume a large amount of power during packet reception or while waiting to receive packets. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

In some aspects, an apparatus for wireless communication is disclosed. The apparatus comprises a first receiver configured to receive at least a first signal; a circuit comprising a second receiver configured to receive a second signal, wherein the second signal comprises a wake-up signal configured in NDP format including a signal field, the second receiver configured to, when in an awake state, consume less power than the first receiver when in an awake state, wherein the circuit is configured to take at least one action based on the second signal.

In some aspects, an apparatus for wireless communication is disclose, comprising first means for receiving at least a first signal; second means for receiving a second signal, wherein the second signal comprises a wake-up signal configured in NDP format including a signal field, the second receiving means configured to, when in an awake state, consume less power than the first receiving means when in an awake state, wherein the second means is configured to take at least one action based on the second signal.

In one aspect, a method for wireless communication is disclosed, comprising receiving at least a first signal; receiving a second signal, wherein the second signal comprises a wake-up signal configured in NDP format including a signal field, the second receiving means configured to, when in an awake state, consume less power than the first receiving means when in an awake state, wherein the second means is configured to take at least one action based on the second signal.

In some aspects, a computer program product comprising a non-transitory computer readable medium encoded thereon with instructions that when executed cause a wireless communications apparatus to perform a method of wireless communication, said method comprising receiving at least a first signal; receiving a second signal, wherein the second signal comprises a wake-up signal configured in NDP format including a signal field, the second receiving means configured to, when in an awake state, consume less power than the first receiving means when in an awake state, wherein the second means is configured to take at least one action based on the second signal.

DETAILED DESCRIPTION

Figure 1:
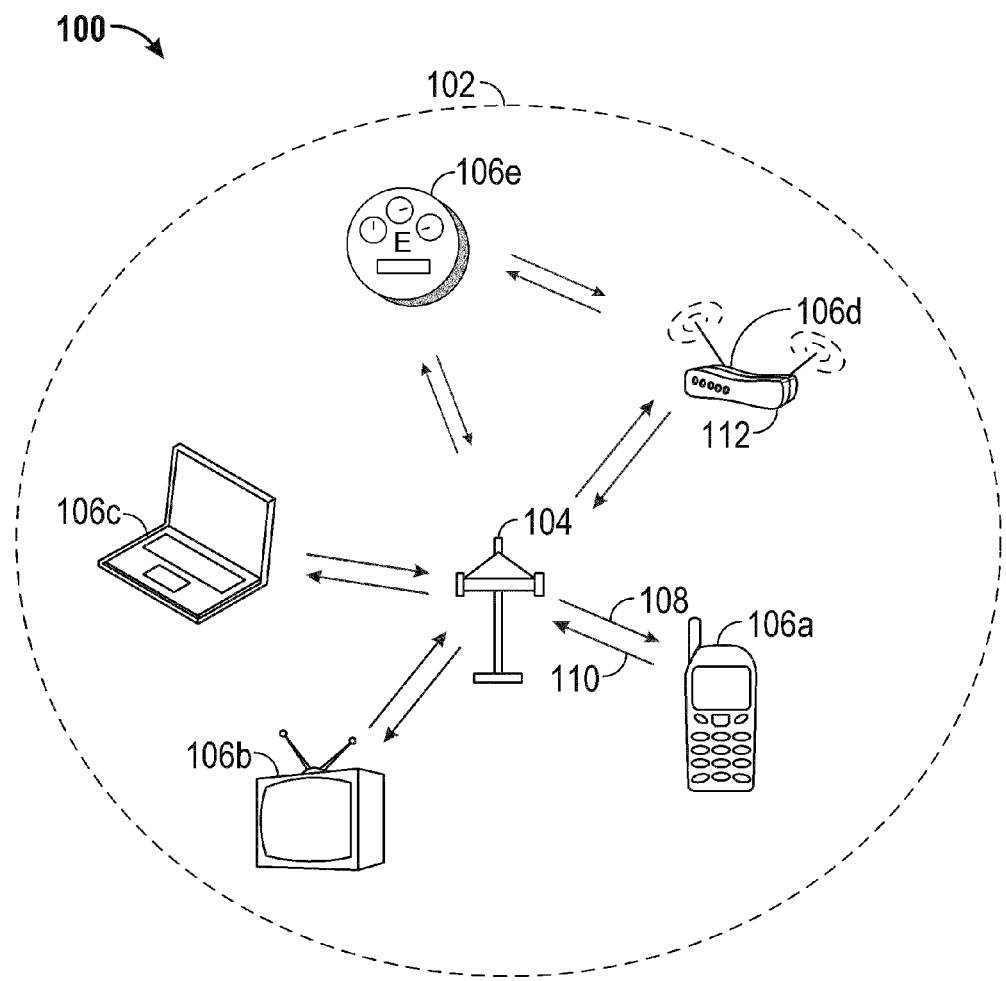
FIG. 1 shows an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11 ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11 ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless devices consume power when transmitting or receiving signals. Certain of the devices described herein operate in a plurality of states with differing capabilities and different levels of power consumption. For example, receivers consume more power in an awake state, during which time receiver circuits are activated and may receive incoming signals, or in a doze state during which time circuits are not activated and don't receive incoming signals. Reducing the amount of time that receivers are in an awake state and waiting to receive incoming signals reduces power consumption.

Wireless devices employ various power management modes to manage operation states. These power management modes include "Active," where the device is always in an Awake state, "Normal Power Save," where the device can be either in an Awake state or a Doze state, or "Power save with low power," where the device can be in Awake state or a Low Power state which may save more power than when the device is in a Doze state. While the implementations described herein that relate to using a paging message that may be received by a ultra-low power receiver (that is, a second receiver in a device) may be applicable to many different power modes of operating a wireless device, for clarity of the disclosure, the examples of certain implementations described herein generally relate to using a Normal Power Save mode.

A simple way to reduce the time that a receiver STA is awake is to transition the receiver to doze state for most of the time, except for those short intervals of time agreed with the transmitter when signals may be sent from the transmitter to the receiver. This is neither flexible nor efficient because in typical applications, the traffic pattern is unpredictable. The agreed awake time may not match the traffic pattern, so some awake times may not correspond to transmit times. There may also be times when transmitted signals are not received because they are transmitted outside of the agreed awake time.

A more flexible and effective approach is for the receiver to doze until a trigger event triggers the receiver to transition to awaken. In some implementations, the trigger event is generated when a circuit receives a wake-up wireless signal. Power consumption is reduced in cases where the wake-up signal is configured so that circuitry that receives the wake-up signal is a simple and low power receiver. The low power receiver (sometimes referred to as a "wake-up receiver") is configured to consume less energy than the regular data receiver to reduce overall power consumption of the wireless device.

In one implementation, a STA's regular data receiver is in doze state. A transmitter (e.g., of an AP or other STA) wirelessly sends a signal to the STA's low power receiver. The STA's low power receiver receives the wireless signal and performs some action. For example, the action may be to wake-up the STA's regular data receiver (either immediately or at a specified time or time delay) to an awake state such that the STA's regular receiver can receive data. In some cases, the STA then sends a message to inform an AP or another STA that it is awake. Then, an AP or STA may send data to the STA's regular receiver, and it is received and processed by the STA.

For some devices, the wireless signal received by the low power receiver (sometimes referred to as an "ultra low-power receiver") may be a short paging message ("page"). In some implementations in this disclosure, protocols are identified for using such signals or pages to conserve power. This may be in the context of a plurality of power save mode protocols including but not limited to regular PS protocol and U-APSD. Implementations of the timing of the pages, potentially with respect to a beacon, related setup signaling, and page formats are also disclosed.

There may be multiple formats of the short page message including but not limited to 1 MHz PHY preamble, 2 MHz PHY preamble, or short control frame with various transmission rates. Different formats may be suitable for different scenarios. The STA may ask the AP to use a specific one as a paging message. The format of the short paging signal is agreed between AP and STA at the association or later through a management frame exchange.

In such implementations, the page format, content, and definition of the transmitted and received pages, which are received by the low power receiver of a wireless device, are known by the transmitting and receiving wireless devices so that the receiver can identify and parse incoming pages. In some implementations, the AP or other STA would send a page at certain target times and/or time intervals. In some implementations, other messages may not be sent to the STA at that time. By sending known and agreed to short paging messages at target times, the receiving STA can use a simple and low power receiver circuit designed to receive certain pages of expected configurations and content. Receiving STAs may be further configured to reduce power additional power consumption by a power saving scheme that places the wake-up circuit in a doze or in an awake state. In some implementations, such doze and awake states may be similar to, or the same as, doze and awake states employed for a STA's regular data receivers and transceivers.

In some implementations, the page received by the low power receiver may be an NDP Control frame consisting of a PHY preamble only. The page can include wake-up information in a SIG field of the frame. In other implementations, the page may be a MAC frame. MAC frame examples include a regular ACK with More Data set to 1, a QoS-CF-ACK frame, or another short MAC frame. These, and similar short message lengths, and well defined, finite set of pages, enable decoding circuitry with simpler logic, less memory and less expensive clocks than is possible with longer message, less well defined, or a larger set of inputs. Such circuitry may be optimized to receive and decode the pages in implementations optimized to reduce power consumption, use less memory, and/or a simpler clock than the primary STA receiver that receives beacons and BUs. Such implementations reduce signal length and receive power consumed, thereby increasing battery life. The circuitry in a STA to receive and decode pages may be implemented as a separate receiver integrated with other circuitry.

In some implementations, pages coexist with beacons. They may be repeated with the same or a different duty cycle as beacons. In other implementations, pages may replace beacons.

In some implementations, pages include duration parameters that can be used to reduce contention. For example, timeslots can be dedicated to one or several STAs for uplink and/or downlink transmissions during the period of duration, or other purposes during the duration set, during the wake-up protocol.

In some implementation, pages instruct wireless device to transition the primary receiver to sleep. This reduces battery consumption, and may be used when the AP does not have any BUs for the STA.

Wireless devices including APs may send pages for timing synchronization with one or more devices including STAs. For example, a page with a "no data" message can be sent for synchronization.

Pages sent between wireless devices may also provide information about the communications medium, changes in protocol, changes in identification parameters, changes in the target beacon transit time (TBTT), or other similar information.

For some implementations of wireless or wired networks of devices, that may include sensor networks, there may be a class of applications with low duty cycle up load (UL) and down load (DL) traffic in combination with strict latency requirements in receiving DL data. For example, it may be necessary to respond to an alarm or a command with under a second of latency. Regular PS mode, which uses a beacon to indicate DL data, may not be efficient enough, even though 802.11ah defines a short beacon of 560 us+>13B+ TIM@150 Kbps>1.5 ms. The TIM size is not bounded and additional fields/IEs may be present.

For some implementations, a low power receiver and enhanced paging protocols may enable optimized receiver operations. The protocol may coexist with existing 802.11 power save operation modes, and may be built on top of existing 802.11ah mechanisms, such as Target Wakeup Time with synch frame.

For these implementations, the STA communicates with the AP to determine a Target Wakeup Time (TWT). The STA also indicates to the AP whether, at the TWT, the STA would like to receive a short paging message indicating whether there is any buffered units at the AP for the STA. The STA can send a Management frame to the AP including above requests and any other parameter that may be required, such as a suggested time for the TWT. If the STA requested that short paging be sent, and if data is pending, the AP sends a very short paging message directed to the STA, at a Target Wakeup Time. This may extend to a groupcast if the same TWT is assigned to more than one STA. For a STA that receives this message, the STA has three options. The first option is to act as if it received a TIM indicating Buffered Units (BUs), and send a PS-Poll or trigger frame. The second option is to read the next short beacon and proceed as in regular Power Save (PS). The third option is to wait for a further poll message from the AP after a certain time.

For these implementations, the very short paging message is an NDP control frame. The control frame includes a (partial) AID of the STA being paged. The control frame also includes a bit indicating where there is a BU for the STA. In some cases, the control frame includes synchronization information such as a plurality of LSBs of timestamp. The pages are received at TWTs, and beacons at TBTTs. Pages are optimized RX ON 560 us. In regular PS mode, the STA decodes a short beacon.

By using pages, the STA only needs to decode a short NDP control frame. For some implementations, it takes less than one third as long to decode NDP control frames than beacons. For example, over 1.5 ms to decode a short beacon and more than three times as short a time to decode an NDP control frame.

In some implementations, an optimized receiver receives paging messages instead of a full receiver. Examples where this is possible are cases where the pages are well defined. A PHY receiver may be optimized to detect and decode NDP frames only. There may be limited operations upon reception, with a simple MAC.

In some implementations, the data duty cycle will be low. In some implementations, it is likely that at any point in time, only one STA needs to be paged. In some implementations, different STAs may be assigned different or nearby TWTs. In some implementations, multiple STAs may be assigned the same TWT. A group AID may be defined to page multiple STAs. Multiple NDPs may be sent in sequence targeting one STA each.

One advantage of the methods and systems described in this disclosure is that they optimize download delivery. Existing Target Wake Time (TWT) with synch frame approaches, such as those approved by IEEE, focus on improving upload access.

The proposed methods and systems in this disclosure enhance existing TWT with Synch frame concepts already approved by IEEE. Existing approved approaches benefit UL access more than DL delivery. For TWT, the STA and AP agree on a wakeup time for UL and DL data exchange. The synch frame sent by the AP at the TWT slot boundary to enable faster UL medium access, in existing approaches. This disclosure extends the existing mechanism to optimize download delivery also.

In some implementations, the AP sends a synch frame at the slot boundary or target wake time of the STA, if the channel is idle and the STA requested to receive a synch frame to quickly synch to the medium or the STA requested to receive a notification of downlink buffer units or a check beacon. The synch frame is an NDP control frames that includes in SIG: (partial) AID of the target STA, control information (BU present, read beacon, synch only) After sending an NDP synch frame, the AP need not send data or management frames to the STA before the STA is in active mode.

For some implementations, a 1-2 MHz PHY preamble SIG field of NDP synch frame may include a Partial AID (hash of AID and BSSID of about 6-13 bits). It may also include an info field with bits for pending BUs, and read beacon. Both bits are set to 0 for Synch only for UL data. When pending BU is 0 and read beacon is 1, the STA is instructed to read the full beacon. When pending BUs is 1 but read beacon is 0, the STA is informed that BUs are available, so send a PS-Poll or wait for data. When both bits are set to zero, the STA is instructed to read the TIM beacon.

For some implementations, the number of bits for CRC, Tail, MAC-NDP, Type, Partial-AID, and Info/reserved is 4, 6, 1, 4, 6-13, and 8-15, respectively. For other implementations, the number of bits for CRC, Tail, MAC-NDP, Type, Partial-AID, and Info/reserved is 4, 6, 1, 4, 6-13, and 20-27, respectively.

For most implementations, replacing beacons with pages will reduce energy assumption. An evaluation may start by assuming receive power of 100 mW, sleep power or 10 mW, clock drift of 20 ppm, and no BU by the STA still checks to guarantee latency. By replacing a short beacon of 16 bytes at MCS0 rep2 (1.4 ms) with a short page of 240/560 us, and assuming the same period for the page option as used for the beacon baseline, the paging framework consumes significantly less energy. Optimized receivers may be designed to further lower energy consumption. With an optimized receiver, very significant energy saving, especially at low latencies is possible, estimated for a 5-10× battery life improvement at 100 ms latency, and 2-5× battery life improvement at 2 s latency.

In some implementations, the AP uses Point Coordination Function (PCF) Interframe Spaces (PIFS) to send a synch frame at the slot boundary or target wake time of the STA, if the STA requested to receive a synch frame to quickly synch to the medium or the STA requested to receive a notification of downlink buffer units or a check beacon. The AP aborts transmission of the synch frame after a time T after the target wake time of the STA. The synch frame is an NDP control frames that includes in SIG: (partial) AID of the target STA, control information (BU present, read beacon, synch only) After sending an NDP synch frame, the AP need not send data or management frames to the STA before the STA is in active mode.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

The AP 104 may transmit a short page message signal (or simply a "page"), via a communication link such as the downlink 108, to other nodes STAs 106 of the system 100, which may help the other nodes STAs 106 to synchronize their timing with the AP 104, or which may provide other information or functionality. Such pages may be transmitted periodically. In one aspect, the period between successive transmissions may be referred to as a page superframe. Transmission of a page may be divided into a number of groups or intervals. In one aspect, the page may include, but is not limited to, such information as the time to wake-up the receiver, the time to put a receiver to sleep, or duration information, timestamp information to set a common clock, a peer-to-peer network identifier, a device identifier, capability information, a page superframe duration, transmission direction information, and/or reception direction information, some of which are described in additional detail below. Thus, a page may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Accordingly, in certain wireless communication systems 100, the AP 104 may transmit paging messages to a plurality of STAs 106 that are in a power save mode, the paging messages indicating whether or not there is data buffered at the AP 104 for the STAs 106. The STAs 106 may also use this information to determine whether they need to be in an awake state or a doze state. For example, if an STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, paging messages may include a bitmap (not shown in this figure), such as a traffic identification map (TIM). In certain such aspects, the bitmap may include a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state) to be able to receive Buffered Units (BUs) that the AP 104 has for that particular STA. Accordingly, the size of the bitmap may be directly proportional to the number of STAs 106 in the wireless communications system 100. Therefore, a large number of STAs 106 in the wireless communications system 100 may result in a large bitmap.

In some aspects, STAs 106 that sleep for a long time may not wake up to read incoming TIM messages. For example, a STA 106 may be configured to sleep through one or more TIM messages in an extended sleep mode. In this case, the STA 106 may previously have advertised to the AP 104 that the STA 106 may not read any TIM messages. Accordingly, the AP 104 may not include the corresponding identifiers in the TIM message. In various implementations, the STAs 106 can notify the AP 104 that they may not wake up for one or more TIM messages (e.g., that they are operating in the aforementioned power saving mode) using a control message, or immediately during association.

For STAs 106 that have notified the AP 104 in this manner, the AP 104 may not include identifiers in the TIM message, even when it has BUs intended for them. STAs 106 may claim their BUs by sending a PS-Poll at any time to the AP 104. In an implementation, AP 104 may immediately send the BU in response to the PS-Poll. In another implementation, the AP 104 may respond to the PS-Poll with an ACK, and deliver the BU at a later time. In yet another implementation, the AP 104 may not immediately respond (neither with ACK nor with BU) to a PS-Poll. The AP 104 may instead reply with a Cumulative ACK frame sent after a given scheduled time after the TIM message.

In various implementations, the STA 106 can specify the waiting time to deliver the BU via the PS-Poll (for a dynamic indication), an association request, a probe request, and/or another management frame sent to the AP (for a static indication). In other implementations, the AP 104 can specify the waiting time to deliver the BU via an acknowledgement (ACK or ack) frame, a TIM element (for a dynamic indication), a beacon, an association response, a probe response, or other management frames sent to the STA 106 (for a static indication). The STA 106 may go to sleep for the waiting time duration. The STA 106 may acknowledge correct reception of the BU by sending an ACK. The STA 106 may then go back to sleep.

Figure 2:
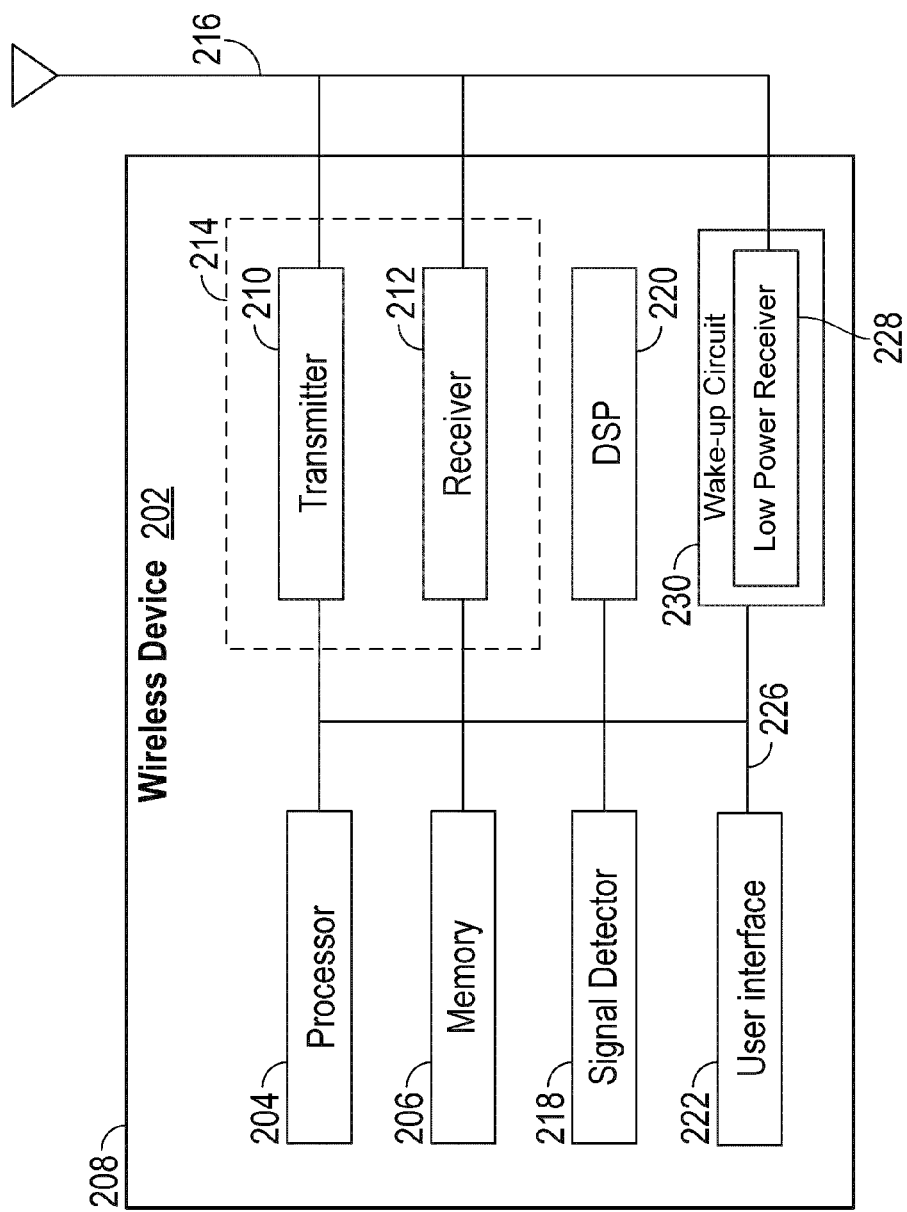
FIG. 2 illustrates a block diagram of an example of a wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, one of the STAs 106, or one of the relays 320 and/or 330.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The receiver 212 may be configured to wirelessly receive packets having different MAC header types. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. A STA 106 that is a wireless device 202 having the low power receiver 228 may be referred to herein as a low power receiver STA 228. Other STAs that may not include the low power receiver 228 or may be operating in a mode where the transceiver 214 is activated may be referred to herein as a STA 106.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or a STA 106, and may be used to transmit and/or receive communications. That is, either AP 104 or STA 106 may serve as transmitter or receiver devices. Certain aspects contemplate signal detector 218 being used by software running on memory 206 and processor 204 to detect the presence of a transmitter or receiver.

A receiver of a STA 106, such as receiver 212, may consume a large amount of power during reception of packets from the AP 104 or another STA or while waiting for a packet to be received. The amount of power that is consumed by the STA 106 may be reduced if the receiver is shut off for short intervals of time. For example, the receiver of STA 106 may be shut off or turned on at times agreed upon by the AP 104 and the STA 106. However, shutting off the receiver at an agreed upon time may not be flexible or efficient. The traffic pattern to and from the AP 104 may not be predictable such that the agreed upon time may occur when no packets are ready to be transmitted to the STA 106. Likewise, packets may be ready to be transmitted to the STA 106 when the receiver of the STA 106 is shut off.

In some implementations, some of the drawbacks described above may be minimized by including a second receiver in the STA 106. The second receiver may be a low power receiver compatible with WLANs (e.g., the IEEE 802.11 protocol, etc.). For example, the low power receiver of the STA 106 may be able to communicate with the AP 104 (e.g., receive packets from the AP 104). As another example, the low power receiver of the STA 106 may be able to communicate with other STAs, including those that are not associated with the STA 106. As is described herein, the use of a low power receiver may reduce energy consumption.

Generally, a STA 106 (for example, wireless device 202) may include an RF wakeup receiver that wakes up the receiver 212 from a sleep or doze state when a message is received from the AP 104 or another STA. The RF wakeup receiver may reserve medium for the receiver 212 to wake up and start receiving data. In further embodiments, the RF wakeup receiver may be turned on and off based on a schedule agreed upon with the AP 104. This may further reduce energy consumption.

In an implementation, the STA 106 may be in one of several states for a given power management (or power saving) mode the STA 106 is operating in. For example, the states may include an active state in which the STA 106 is "awake" and the STA 106 can receive (on its main signal receiver 212), process and transmit signals. In other words, in an active state, the receiver 212 of the STA 106 and any associated analog and/or digital circuits may be turned on such that the STA 106 can receive, process and transmit signals. When the STA 106 is in a PS mode, the STA 106 may be in an awake state or a doze state. In the doze state, the STA 106 cannot receive signals on the main signal receiver 212 and less power is consumed. To receive signals, the STA 106 may be placed in an awake state and typically it periodically awakens (for example, every 100 ms to check for beacons). In some implementations, the STA 106 can also operate in a PS low-power mode (PS-LP mode). In the PS-LP mode, a main signal receiver of a wireless device (for example, receiver 212 of device 202) does not normally awaken periodically, but instead the main receiver is caused to wake-up when a low-power receiver 228 receives a signal indicating to wake up the main receiver 212. Accordingly, in some implementations of a PS-LP mode, the states of the STA can be awake, doze, or low-power (where a STA does not wake-up periodically but instead is awoken by a signal received at a low-power receiver. In other implementations of a PS-LP mode, the states of the STA can be awake or low-power, and not have a doze state.

In a PS mode, the STA 106 may be in an awake state (e.g., the receiver 212 and any associated analog and/or digital circuits are turned on) or may be in a doze state (e.g., the RF wakeup receiver is turned on, but the receiver 212 and any associated analog and/or digital circuits are turned off). An AP may not know if a wireless device is operating in a PS-LP mode. For example, legacy devices may not include a low-power receiver. Accordingly, communication protocols may be used that can make use of a PS-LP mode for devices that have such a capability, and also accommodate legacy devices to operate as they normally would.

In some implementations, when a wireless device is in a legacy power saving mode, the wireless device be operational in one of several operational modes. For example, the operation modes may include legacy PS-Poll, unscheduled automatic power save delivery (U-APSD), scheduled automatic power save delivery (S-APSD), tunneled direct-link setup (TDLS) peer power save mode, and/or IEEE 802.11ah target wake times (TWT).

The legacy PS-Poll operation mode may include the STA 106 listening for a traffic indication map (TIM) transmitted by an AP 104. If the TIM indicates that there are bufferable units (BUs), the STA 106 may transmit a PS-Poll to the AP 104. The AP 104 may respond by sending data immediately or an acknowledgement followed by data at a later time. The AP 104 may also indicate if there are any more BUs available.

The U-APSD operation mode may be similar to the PS-Poll operation mode. The STA 106 may transmit a "trigger frame," which may include any data frame (e.g., including QoS-Null) with a AC indication. The AP 104 may respond by transmitting data at a start of a service period and until the service period ends.

The S-APSD operation mode may include the STA 106 and the AP 104 agreeing on a scheduled delivery time of packets. At the agreed upon time, the AP 104 may send a frame (e.g., a CF-Ack) to check if the STA 106 is awake. If the STA 106 is awake, the AP 104 may start a service period as described above with respect to the U-APSD operation mode.

The TDLS peer power save mode may include one or more STAs that agree upon a scheduled time at which both STAs are awake. If data is exchanged, STAs may go to sleep or doze when data indicates that a service period has ended.

The IEEE 802.11ah TWT operation mode may include a STA 106 that agrees with the AP 104 on a periodic window of time for uplink and/or downlink data transfer. The STA 106 may be sleeping or dozing outside of the periodic window of time.

The low-power state described above may also be referred to as an ultra-low power state. Accordingly, in a power save ultra-low power (PS-ULP) state (e.g., a PS-ULP mode), the STA 106 may be in an awake state, in a doze state, or in an ultra-low power (ULP) state (e.g., the low power receiver and/or the low power wakeup receiver are turned on, but the RF wakeup circuit, the receiver 212, and any associated analog and/or digital circuits may be turned off). As described herein, it is assumed that the STA 106 is operating in the PS-ULP state.

In an implementation, in the PS-ULP mode, the STA 106 may transition from the doze state to the awake state, from the awake state to the doze state, from the doze state to the ULP state, from the ULP state to the awake state, from the ULP state to the doze state, and/or from the awake state to the ULP state.

The STA 106 may indicate to the AP 104 that it has transitioned from the doze state to the awake state by transmitting a PS-Poll or a trigger frame to the AP 104. The PS-Poll and/or the trigger frame may indicate that the STA 106 is ready to receive data.

The STA 106 may transition from the awake state to the doze state upon receiving a message from the AP 104 that indicates that the STA 106 can go to sleep. For example, the AP 104 may transmit a parameter indicating that additional data will not be transmitted to the STA 106 and/or the AP 104 may transmit a parameter indicating that the service period has ended. In an implementation, the AP 104 may assume the STA 106 transitioned into the doze state upon transmitting the parameter(s).

In an implementation, the STA 106 and the AP 104 may agree upon a period of time (e.g., a target ULP time (TUT)) during which the STA 106 may be in the ULP state. During the TUT, the AP 104 may transmit one or more ULP messages to the STA 106. In some implementations, the STA 106 may indicate a preferred setting (e.g., based on its wakeup time) by exchanging timing parameters with the AP 104.

The TUT may be defined relative to a time already agreed upon in the context of a S-APSD operation mode or a IEEE 802.11ah TWT operation mode. For example, the time agreed upon in the context of the S-APSD operation mode or the IEEE 802.11ah TWT operation mode may indicate a service period during which the AP 104 may transmit data to the STA 106 (e.g., a period during which the STA 106 is in an awake state). In some implementations, the TUT may occur before or after the service period. In other implementations, the TUT may overlap with the service period. While the TUT and the service period may overlap, the AP 104 may assume that the STA 106 is in the ULP state for the duration of the TUT.

If the AP 104 has BUs available for the STA 106, the AP 104 may transmit a ULP message during the TUT. In some implementations, the ULP message may be transmitted via a unicast transmission directed toward the STA 106. In other implementations, the ULP message may be transmitted via a groupcast transmission directed toward the STA 106 and other STAs. The ULP message may cause the STA 106 to transition from the ULP state to the awake state by the start of the next service period (e.g., the service period agreed upon in the context of the S-APSD operation mode, the IEEE 802.11ah TWT operation mode, and so on). In other words, the ULP message may function as a wakeup signal. If the ULP message is received during a TUT that overlaps with the service period, the STA 106 may immediately or nearly immediately transition into the awake state.

In some implementations, the AP 104 may ensure that the STA 106 transitioned into an awake state before transmitting any data packets during the service period. In an implementation, the AP 104 may send a frame QoS and a CF-Ack that indicates that the service period has not ended, and expect an acknowledgement from the STA 106. The STA 106 may then stay awake and wait for data packets to be received from the AP 104. In another implementation, the AP 104 may expect to receive a PS-Poll or a trigger frame from the STA 106 to indicate that the STA 106 is in the awake state. For example, the ULP message may act as a TIM and the STA 106 may operate as in a regular power saving mode known to one of skilled in the art.

In other implementations, the AP 104 may assume that the STA 106 is in the awake state starting a predetermined time after the ULP message is transmitted (e.g., 10 ms, 100 ms, etc.).

If the AP 104 has no BUs available for the STA 106, the AP 104 may still transmit a ULP message during the TUT. The ULP message may indicate that there is no data available for the STA 106. The ULP message may also allow for synchronization, such that the AP 104 and the STA 106 could schedule a new TUT and/or service period. The ULP message may also allow the STA 106 to transition from the ULP state to the doze state at an earlier time (e.g., before the end of the TUT).

If the AP 104 does not transmit a ULP message during the TUT, the STA 106 may remain in the ULP state until the TUT ends. After the TUT ends, the STA 106 may transition into the doze state. If the TUT overlaps with the service period, the STA 106 may transition into the awake state after the TUT ends.

In some implementations, the STA 106 may transition from the awake state to the doze state after the service period ends. In other implementations, the STA 106 may transition from the awake state to the ULP state after the service period ends if the STA 106 indicates that the STA 106 will always be in the ULP state when not in the awake state.

In other implementations, the STA 106 and the AP 104 may agree upon a given schedule, such as like in the context of the S-APSD operation mode or the IEEE 802.11ah TWT operation mode, and the STA 106 may indicate whether it will be in the active state or the ULP mode during the scheduled time. If the STA 106 is in the ULP mode, the AP 104 may behave as described above (e.g., the AP 104 may transmit a frame QoS and CF-Ack after the ULP message and expect an acknowledgement from the STA 106 or the AP 104 may expect a PS-Poll or trigger frame from the STA 106).

Figure 3A:
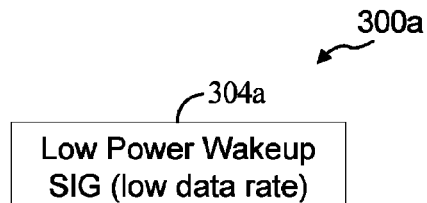
FIG. 3A shows an example of a low power wake up signal, in accordance with an implementation of the invention.

FIG. 3A shows a possible structure for a low power wake-up signal 300a. The wake-up signal 300a may be a single-phase signal 304a that carries an encoded signal. The wake-up signal may be transmitted using on-off keying, frequency-shift keying, or the like. For example, if using something similar to on-off keying, the wake-up signal 300a may be a sequence represented as zeros and ones. When the wake-up circuit 230 and low power receiver 228 detect a particular sequence of zeros and ones, the wake-up circuit 230 may trigger turning on the transceiver 214. The wake-up circuit 230 may have multiple correlators to try to detect each possible signal.

Figure 3B:
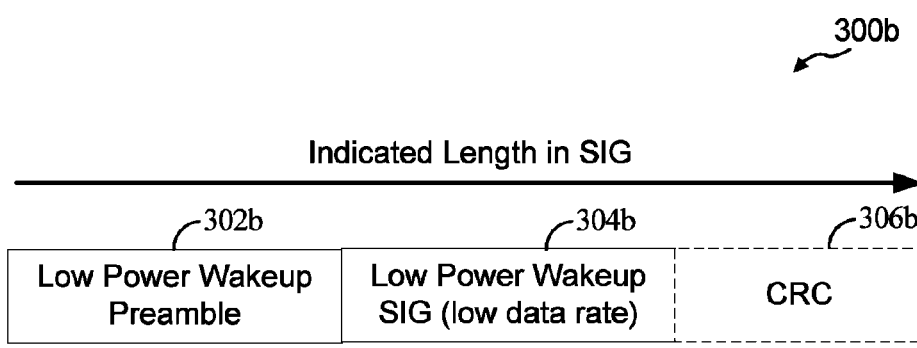
FIG. 3B shows another example of a low power wake up signal, in accordance with an implementation of the invention.

FIG. 3B shows another possible structure for a low power wake-up signal 300b. The low power wake-up signal includes two portions. This first portion 302b includes a 'global' sequence (robust), i.e. like a 'low power wake up preamble.' This may allow the low power receiver 228 to detect that a low power signal 300b is coming up. The second portion 304b, following the first portion 302a, includes encoded information. The encoded information may indicate the identifier of the STA 106e to be woken up or other information. Optionally, there may be a third portion 306b including a checksum for error detection. The first portion 302b may be formed using an on-off keying, frequency-shift keying, or other modulated preamble sequence that may provide the timing and detection. In some implementations, the second portion 304b may include data that may be spread/encoded. Spreading/encoding may be agreed by transmitting and receiving STAs.

In addition, the low power wake-up signal may be provided in a sequence of transmissions that provide for coexistence. For example, an additional 'Wakeup PPDU format' preamble may be provided, such as an new wake-up PPDU format for a 802.11 OFDM PHY preamble followed by the new low power wake-up signal. The OFDM PHY preamble may indicate a duration (in SIG field) that makes 802.11 STAs defer for the duration of the signal and the wake-up time for the receiver. The 802.11 STAs may assume there is a regular packet coming up. As such, reception of the payload may fail, but the 802.11 STA defers for the time indicated in PHY preamble. Furthermore, the low power wake-up signal may be provided to have up to ~20 ms signaling duration to match the duration of a typical PPDU. In addition, Null Packets (QoS Null frames to the STA) may be sent during the wake-up time (e.g., period of time the transceiver 214 of the low power receiver STA 106e needs to be turned on) to make sure other devices honor contention based mechanisms for accessing the channel. In addition, there may be multiple wake-up signals protected by a same PHY preamble. In addition, the PHY preamble may have a bandwidth that narrower than an 802.11 preamble.

Figure 4:
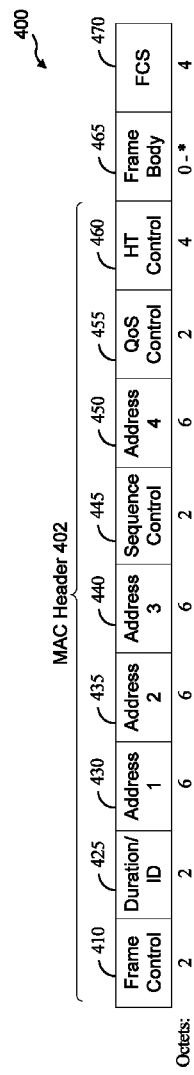
FIG. 4 shows an example of a structure of a media access control (MAC) frame 400.

FIG. 4 shows an exemplary structure of a media access control (MAC) frame 400. As shown, the MAC frame 400 includes 11 different fields: a frame control (fc) field 410, a duration/identification (dur) field 425, a receiver address (a1) field 430, a transmitter address (a2) field 435, a destination address (a3) field 440, a sequence control (sc) field 445, a fourth address (a4) field 450, a quality of service (QoS) control (qc) field 455, a High Throughput (HT) control field 460, the frame body 465, and a frame check sequence (FCS) field 470. The fields 410-460 make up the MAC header 402. Each field may be comprised of one or more sub-fields or fields. For example, frame control field 410 of media access control header 402 may be comprised of multiple subfields, such as a protocol version, type field, subtype field, and other fields discussed below with respect to FIG. 6.

Figure 5:
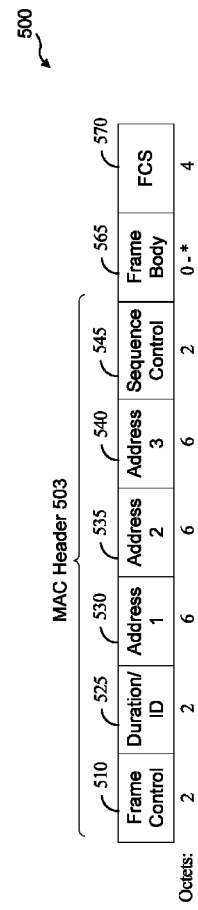
FIG. 5 illustrates an example of a structure of a media access control (MAC) frame 500.

FIG. 5 shows another implementation of a MAC header 503. MAC header 503 differs from MAC header 402 in that it does not include the QOS Control field 455 and HT Control field 460.

Figure 6:
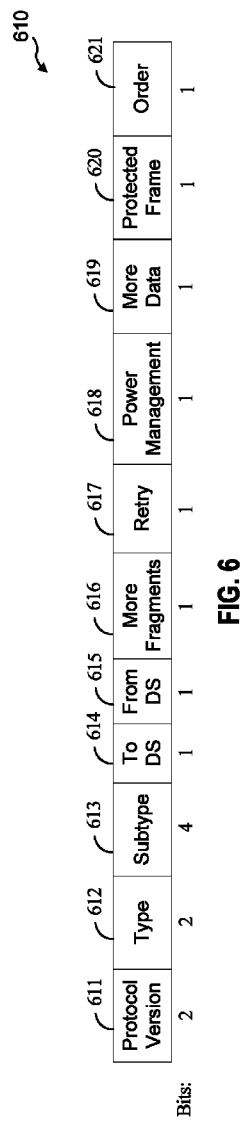
FIG. 6 illustrates an example of a structure of a media access control (MAC) of the MAC headers shown in FIGS. 4 and 5.

FIG. 6 shows an exemplary structure of a frame control field 410 and 510 of the MAC headers 402 and 503 shown in FIGS. 4 and 5 respectively. As shown, the frame control field includes a protocol version field 611, a type field 612, a subtype field 613, a To DS field 614, a from DS field 615, a more fragments field 616, a retry field 617, a power management field 618, a more data field 619, a protected frame field 620, and an order field 621. The type of the MAC frame 500 may be defined by the combination of type and subtype fields 612 and 613. For example, for a management frame, the type field 612 may have a binary value of 00. The subtype field 613 may then indicate the type of management field with a four bit value providing 16 different management field types. As another example, the type of MAC frame 500 may be a control frame indicated by a type field 612 with a binary value of 01. The subtype field 613 may further indicate different types of control fields such as block ack request frames, block ack frames, PS-poll frames, request to send (RTS) fields, clear to send (CTS) fields, and the like.

In some cases it may be advantageous to define new types and formats of MAC frames for different uses/purposes. For example, it may be advantageous to define a new management frame type to provide for enhanced power management capabilities. For example a new management frame subtype may indicate a management frame defining how a power management indication of a wireless message should be interpreted by a receiver. In an implementation, the new management frame may define whether the indication of a second power management state indicates the second or a third power management state. For example, in an implementation, the new management frame may include data defining how the indication should be interpreted. In an implementation, the data may be included in an extended capabilities element. Alternatively, two new management frames may be defined. In this implementation, a first new management frame defines the power management indication to indicate a second power management state, while a second new management frame defines the power management indication to indicate a third power management state.

Figure 7:
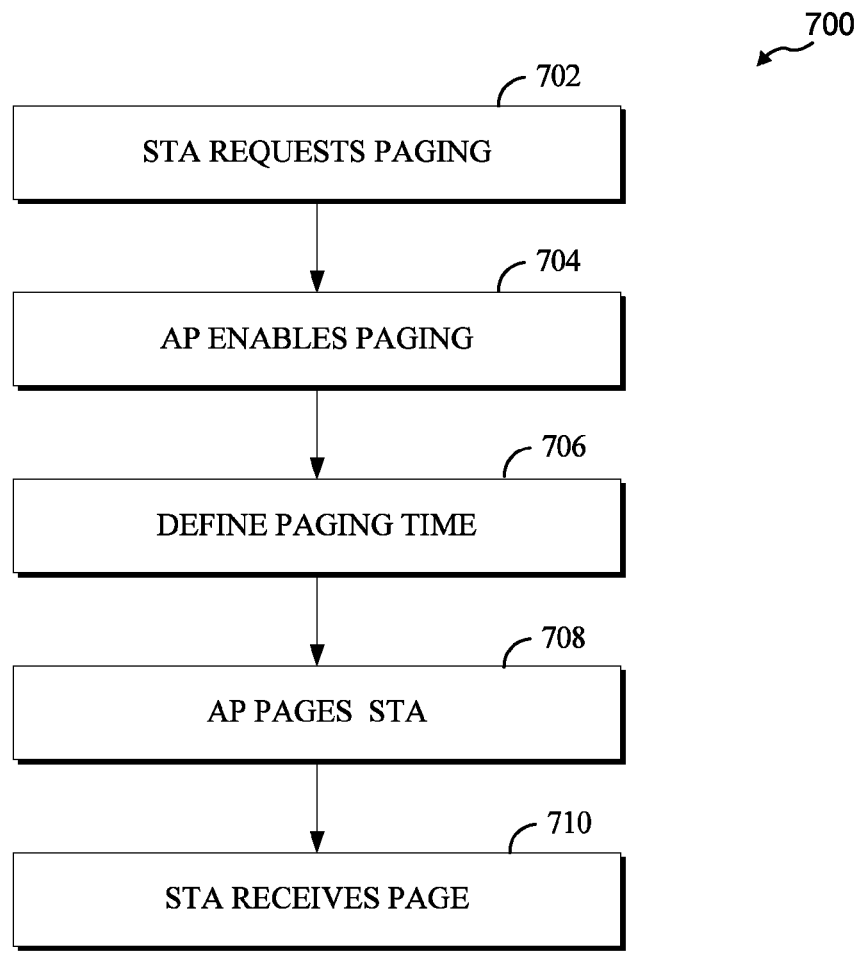
FIG. 7 illustrates an example of a process to establish paging.

FIG. 7 illustrates an example of a process 700 to establish paging in a communication system. In some implementations, the STA is operated in a Power Save (PS) mode with two operational states for the primary receiver: doze or awake. At block 702, the STA sends a request that the AP enable a (very short) paging mode 704 that utilizes communications to a second receiver (a low-power receiver) at the STA. At block 704, the AP enables paging. The STA may indicate a preferred operational setting. Possible paging mechanisms may be a management frame, a PHY preamble, or similar implementation.

At block 707 one or more times for sending and/or receiving page transmissions are defined. The times when the STA is expected to receive the page may be similar to, or offset from, periodic Target Beacon Transit Times (TBTT). The times may differ per STA. In some implementations, multiple STAs may be assigned the same target time.

Similar to beacon transmissions, there can be a Delivery Traffic Indication Message (DTIM) such as considering the time until beacon transmission (DTIM-TUBT), or every N TUBTs. In some implementations, this is where the AP may send ultra-low power (ULP) messages indicating broadcast or multicast BUs are available, or that the AP wants all the active STAs to start contention.

At block 708, at the defined target times or time ranges, the AP may send page(s) to the STA. The STA receives pages using its low power receiver as illustrated in block 710. The AP may assume the STA is awake at the target time to send pages. At some times, the STA may not have the full WiFi receiver on; instead, the STA may only have a low power receiver designed to receive paging messages.

In some implementations, the low power receiver stays on. In other implementations, the STA would turn on the low power receiver before the time of receiving an expected page to allow for wake-up time, warm-up and clock (or timing) drift. The AP needs to be aware of whether the STA is in active state or doze state. When the STA is in active state, the AP may or may not be aware of whether both of the STA's receivers are activated ("fully awake"), or if only the low power receiver is awake. In some implementations, the AP uses knowledge of the STA state and specific receiver activation status (when known) to optimize the signals and signal transmissions.

For cases where the AP has BUs for a STA, in some implementations the AP would transmit a page to the STA at the target time by unicast, groupcast, or multicast, depending on the implementation. Such messages may be directed to one, some, or all STAs active at that time. Accordingly, STA identifiers may be included in pages. In some implementations, the paging signal may be a segment of the TIM. For this case, the AP may use a groupcast. The AP can request that STAs on this segment of the TIM are in a listen mode during the time of the groupcast, or otherwise communicate with the STAs to ensure they are in a listen mode to receive the groupcast. Accordingly, each segment may be transmitted outside of the beacon in a pre-determined time for the STAs on that segment.

In some implementations, pages are defined and known to the AP and STAs. There may be a limited number of page types and parameters for those types. In some implementations, the AP doesn't send another type of message at the target time. For some implementations the STA can use a low power receiver designed to receive the potential set of messages.

In some implementations and at some times, the AP may send a page even if no data is buffered. The page may indicate that there isn't any buffered data. This page may be used for synchronization, have information about the communications medium, a change of protocol, a change of TBTT, change of an ID, or other management information.

Figure 8A:
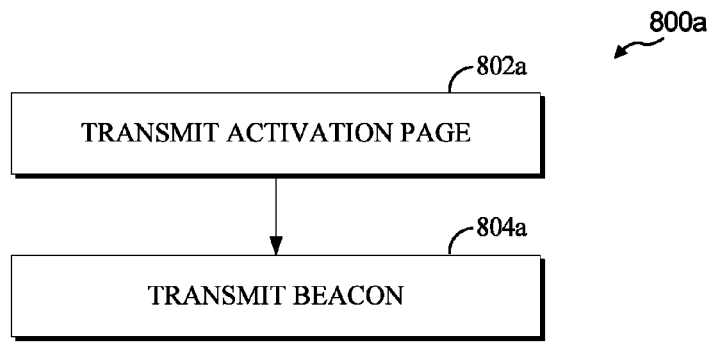
FIG. 8A illustrates an example of a process taken by an access point for an implementation using a wake up page to a low power receiver to activate a primary receiver for subsequent transmissions.
Figure 8B:
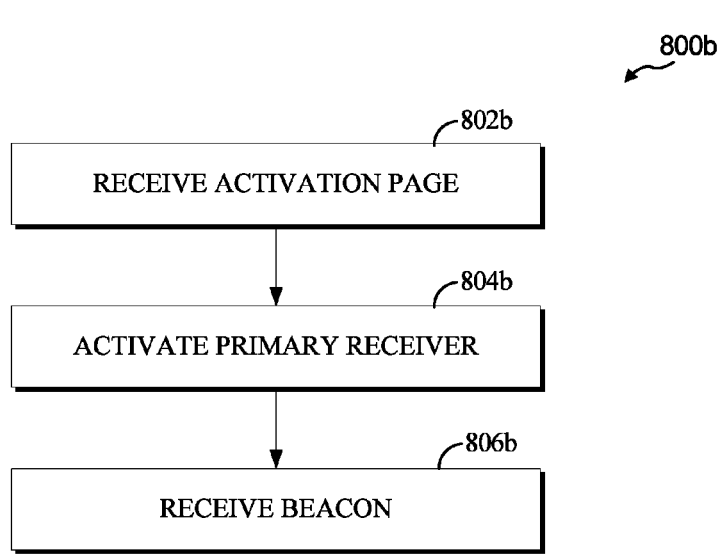
FIG. 8B illustrates an example of a process taken by a station for an implementation using a wake up page to a low power receiver to activate a primary receiver for subsequent transmissions.
Figure 9:
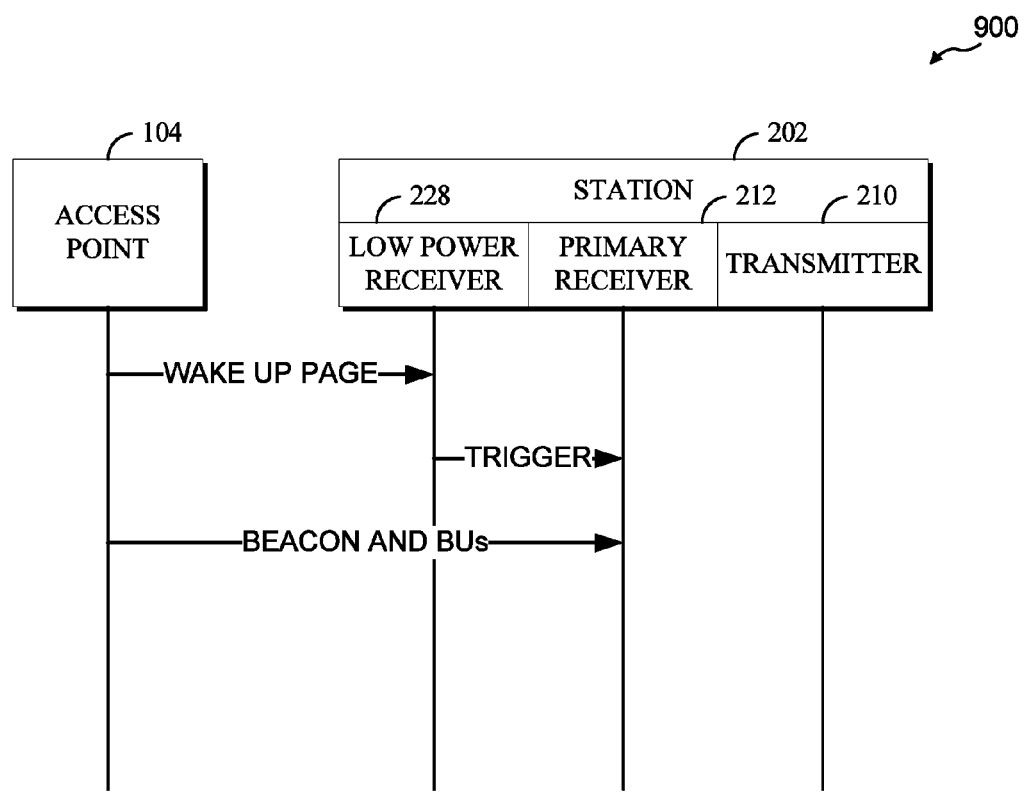
FIG. 9 shows an example of a sequence diagram for an implementation of wireless communications using a wake up page to a low power receiver to activate a primary receiver for subsequent transmissions.

FIGS. 8A, 8B, and 9 show an implementation of a process for near passive receivers to conserve power by reducing power consumption. Referring to FIG. 8A illustrates an example of a process taken by an access point for an implementation using a wake up page to a low power receiver to activate a primary receiver for subsequent transmissions. Process 800a of FIG. 8A shows the process of a device such as an AP 104. At block 802a the AP transmits a page. In some implementations, the STA does not provide the AP any acknowledgement or communication indicating the page was received. At block 804a the AP then sends a transmission to the STA, for example a beacon or another signal communicating data to the STA.

FIG. 8B illustrates an example of a process 800*b* performed by a wireless device (or STA) using a page to a low power receiver to wake-up a primary receiver of the STA to receive one or more subsequent transmissions. At block 802*b* the STA receives a page, for example, from an AP. At block 804*b* the primary receiver is activated based on receiving the page. At block 806*b*, the STA receives a signal using its primary receiver (for example, receiver 212 FIG. 2). The signal may be a beacon or another signal communicating data to the STA.

FIG. 9 shows an example of a sequence diagram for an implementation of wireless communications using a wake up page to a low power receiver to activate a primary receiver for subsequent transmissions. In particular, sequence 900 illustrates an interaction between a transmitting device (AP 104) and a receiving device (STA 202). For some implementations, the AP 104 transmits an activation or wake-up page. The STA receives this page with the low power receiver 228. The STA activates (the "trigger") the primary receiver 212 based on receiving the page. The STA then receives one or more signals using the primary receiver 212, for example, a beacon or BU's sent by the AP 104. The STA can be in a regular power savings mode, such as PS mode or U-APSD.

Figure 10A:
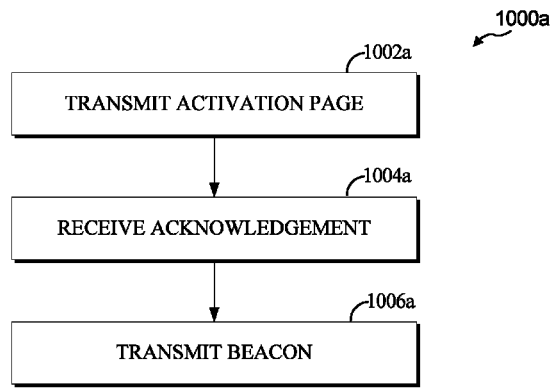
FIG. 10A illustrates an example of a process taken by an access point for an implementation using a wake up page to a low power receiver to activate a primary receiver for subsequent transmissions.
Figure 10B:
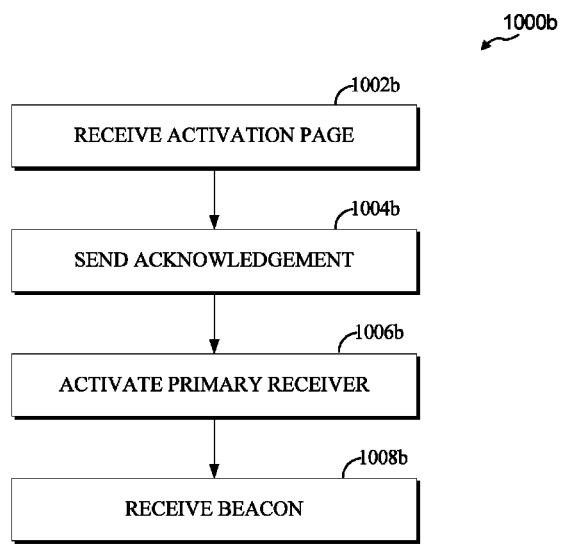
FIG. 10B illustrates an example of a process taken by a station for an implementation using a wake up page to a low power receiver to activate a primary receiver for subsequent transmissions.
Figure 11:
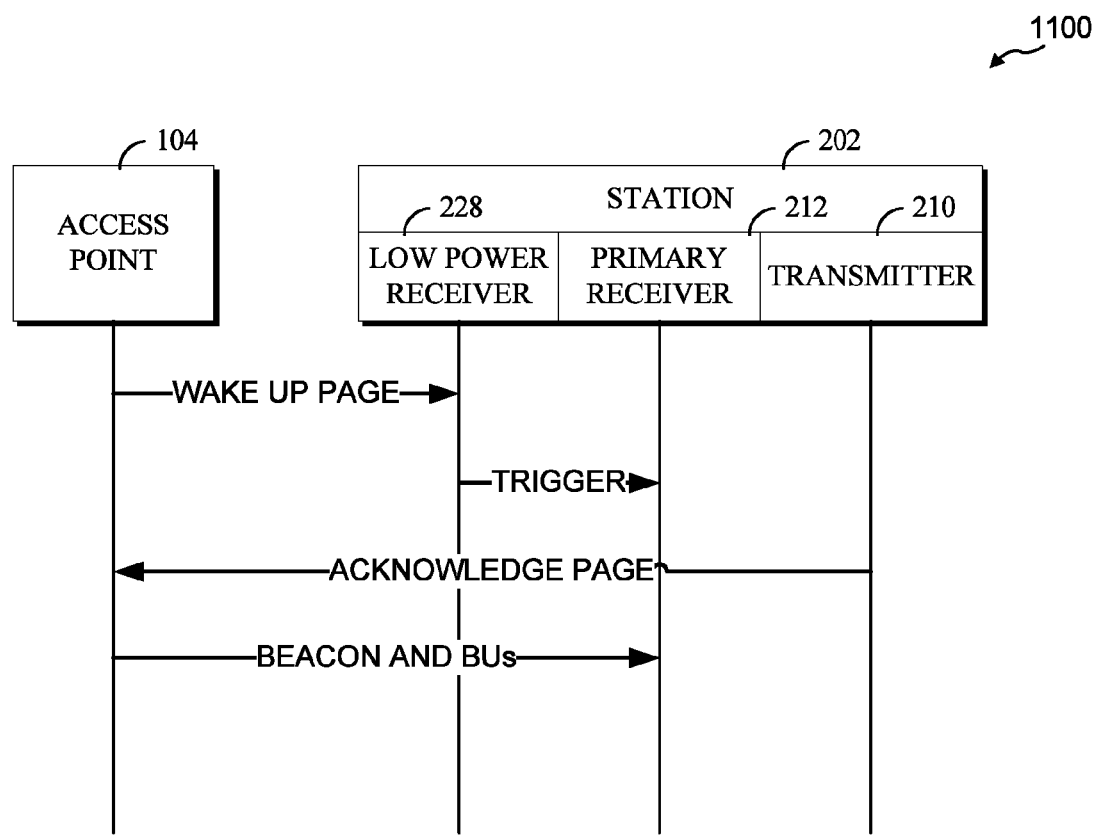
FIG. 11 shows a sequence diagram for an implementation of wireless communications using a wake up page to a low power receiver to activate a primary receiver for subsequent transmissions.

FIGS. 10A, 10B, and 11 show other process implementations of receivers to conserve power consumption. FIG. 10A illustrates a process 1000*a* that may be taken by a transmitting device, such as an AP. FIG. 10B illustrates a process 1000*b* that may be taken by a receiving device, such as a STA. FIG. 11 illustrates a sequence 1100 of interaction between the transmitting (or sending) device and a receiving device. Referring to FIGS. 10A and 10B, at block 1002 a page having information designed to be received by a low power receiver of a STA is transmitted. At block 1002 the STA receives this page. Based on the reception of the page, the STA awakes and at block 1004*b* the STA sends an acknowledgement of receiving the page. At block 1006*b*, the primary receiver of the STA is activated. This may be done at various times as the STA changes to a wake-up state. For example, the primary receiver can be activated before or at the same time as activating the STA transmitter, or it can be done after activating the transmitter and/or after sending the acknowledgement. At block 1006*a* process 1000*a* transmits a signal to the STA, for example a beacon or another type of information. At block 1008*b*, the beacon or other information is received by the primary receiver of the STA. as part of the waking-up process of the STA, with the STA waking up At block 1004*a* the acknowledgement is received. At block to the AP (1004*b*) and activates the primary receiver (1006*b*). Once the AP receives the acknowledgement (1004*a*), it transmits the beacon at the next beacon time (1006*a*). The STA receives the beacon (1008*b*). FIG. 11 illustrates an example of process 1000*a* and 1000*b* in a sequence diagram. In FIG. 11, the AP 104 sends a wake-up page which is received by a low power receive 228 or the STA 202. Based on the receipt of the wake-up page, STA 202 transitions from a doze state to an active state, including activating a primary receiver 212 and a transmitter 210. The transmitter 210 sends an acknowledgement signal acknowledging receipt of the page to the access point 104. In this implementation, after receiving the acknowledgement the AP 104 may send to the STA 202 a beacon and/or other information (e.g., BU's). The STA can then follow its regular power savings mode, such as PS mode or U-APSD.

Figure 12A:
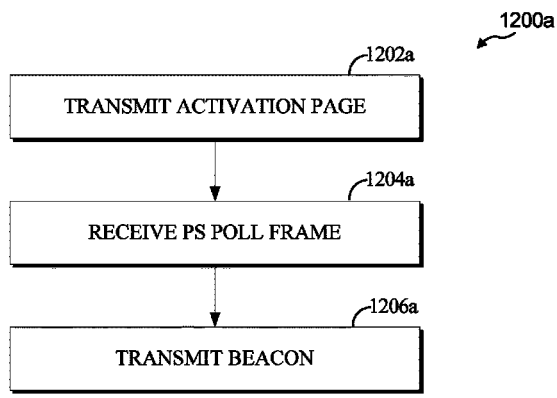
FIG. 12A illustrates an example of a process taken by an access point for an implementation using a wake up page to a low power receiver to activate a primary receiver for subsequent transmissions.
Figure 12B:
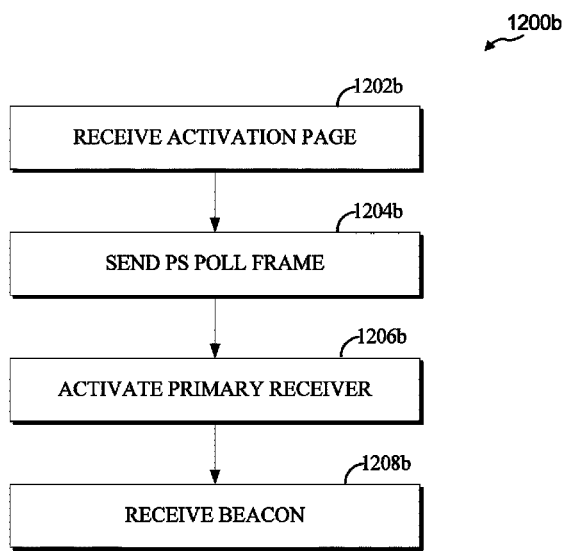
FIG. 12B illustrates an example of a process taken by a station for an implementation using a wake up page to a low power receiver to activate a primary receiver for subsequent transmissions.
Figure 13:
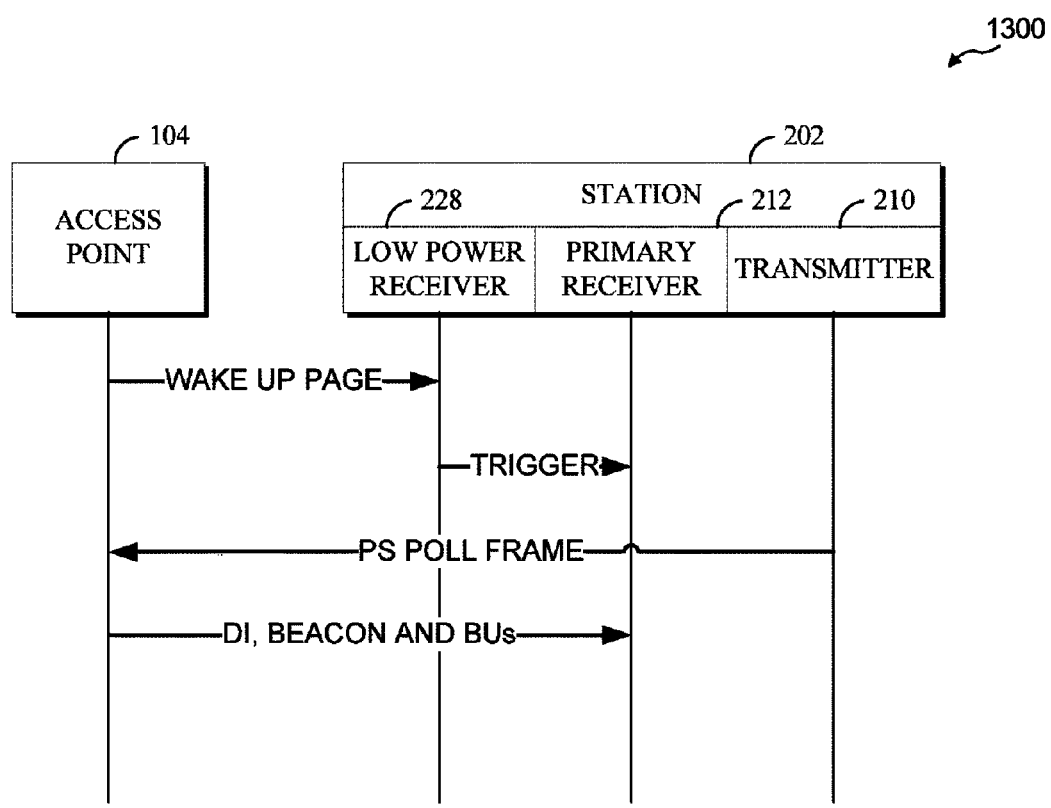
FIG. 13 shows a sequence diagram for an implementation of wireless communications using a wake up page to a low power receiver to activate a primary receiver for subsequent transmissions.

FIGS. 12A, 12B, and 13 show another possible implementation of near passive receivers to conserve power consumption. FIG. 12A illustrates a process 1200*a* of a device, for example an AP 104. FIG. 12B illustrates a process 1200*b* of by a device, for example a STA 106. FIG. 13 illustrates a sequence 1300 shows the interaction between a sending device AP 104 and a receiving device (wireless device) STA 202. Referring to FIG. 12A, at block 1202 an AP transmits an activation or wake-up page. At block 1202*b* the STA receives this page. At 1204*b*, the STA transitions to an active state (if in a doze state) and sends a PS-Poll frame to the AP indicating the STA is awake and can poll for downlink (DL) data. As the STA becomes active it activates a primary receiver at block 1206*b*. At block 1204*a*, the AP receives the PS-Poll frame. At block 1206*a* the AP transmits a beacon at the next beacon time. At block 1208*b* the STA receives the beacon. Sequence 1300 shows this series of transaction for this implementation. The STA can then follow its regular power savings mode, such as PS mode or U-APSD.

Figure 14A:
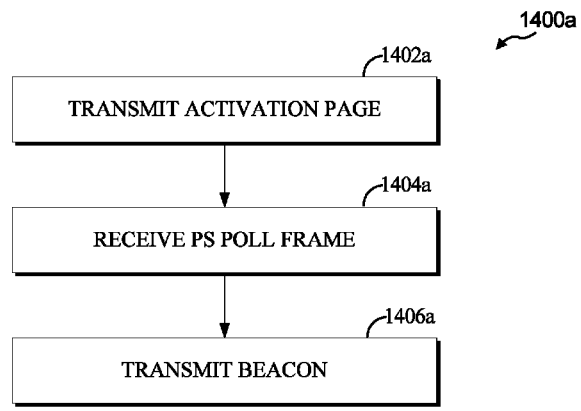
FIG. 14A illustrates an example of a process taken by an access point for an implementation using a wake up page to a low power receiver to activate a primary receiver for subsequent transmissions.
Figure 14B:
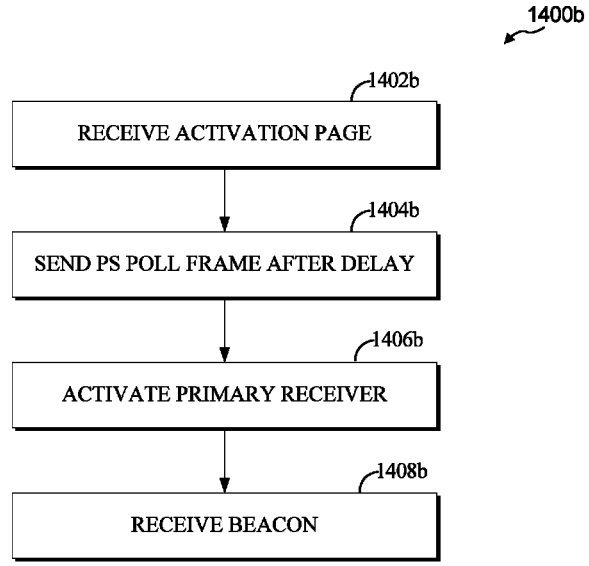
FIG. 14B illustrates an example of a process taken by a station for a implementation using a wake up page to a low power receiver to activate a primary receiver for subsequent transmissions.
Figure 15:
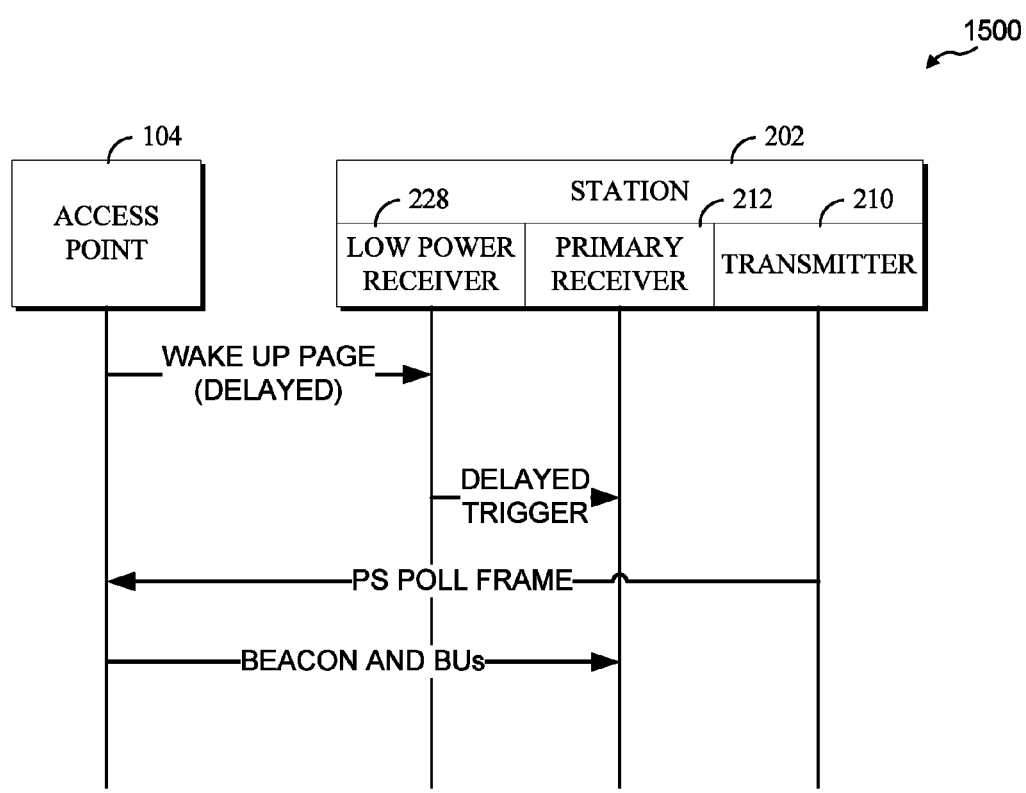
FIG. 15 shows a sequence diagram for a implementation of wireless communications using a wake up page to a low power receiver to activate a primary receiver for subsequent transmissions.

FIGS. 14A, 14B, and 15 show another possible implementation of near passive receivers to conserve power consumption. FIG. 14A illustrates the process 1400*a* of a transmitting device, for example, AP 104 of FIG. 1. FIG. 14B illustrates the process 1400*b* of a receiving device, for example, wireless device STA 106 of FIG. 1. FIG. 15 illustrates a sequence 1500 of an interaction between a sending device and a receiving device. Blocks in both FIGS. 14A and 14B are referred to in describing process 1400*a* and 1400*b*, below. For some implementations, at block 1402*a* the AP transmits an activation or wake-up page with a set time. The STA receives this page at block 1402*b*. At block 1404*b* the STA sends a PS-Poll frame to the AP indicating to the AP the STA is awake. The STA can poll for downlink data at block 1404*b*. At block 1406*b* the STA activates the primary receiver. The AP receives the PS-Poll frame at block 1404*a*. If there is data to send, now knowing the STA is awake the AP sends the data to the STA and the STA receives the data form the AP. At block 1406*a* the STA transmits a beacon (at the next normal periodic beacon time). At block 1408*b* the STA receives the beacon, and further communicates with the AP to receive data for the STA, if necessary.

Schematic sequence 1500 of FIG. 15 further illustrates an example of such interactions. In FIG. 15, AP 104 sends a wake-up page which is received by a low power receiver 228. The wake-up page may include information indicating the low power receiver (or low power circuitry coupled to or comprising the low power receiver) may awaken a primary receiver 212 after a certain delay (if desired, for example, as indicated in the wakeup page. The wireless device also wakes-up transmitter 210. Transmitter 210 transmits a poll message, and the Access Point 104 subsequently provides data to the STA (e.g., BUs). Also, the primary receiver 212 now also receives beacons provided by the AP 104. Once awake, the STA may be operated in a power savings mode.

In some implementations, the AP assumes the STA is awake and sends a packet (data or confirmation of being awake, or a management or control frame) after the time T, where T is specific to the STA and the AP is aware of it from the association time or a management frame.

In some implementations, the paging message may include commands that the STA needs to perform either before or after waking the primary receiver. Pages may include parameters such as timestamps, partial timestamps, AID changes, page slot changes, medium status, or other parameters defined for the wireless systems that includes devices such as APs and STAs.

Figures 16A, 16B:
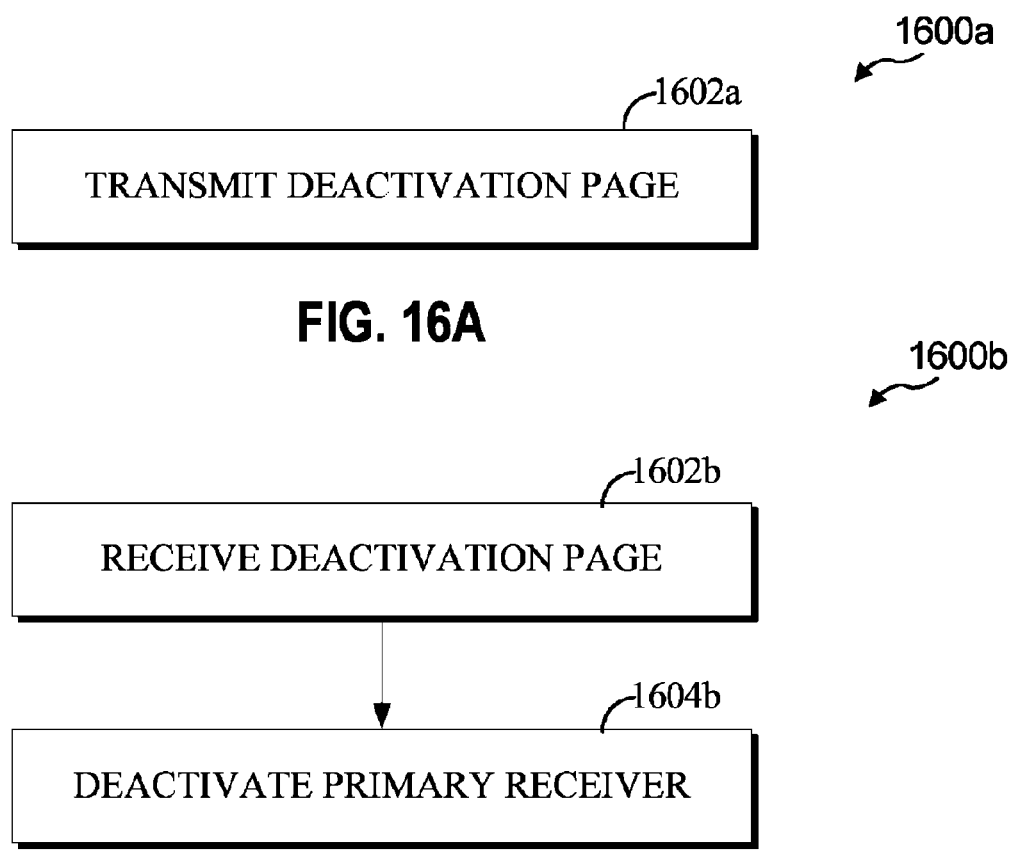
FIG. 16A illustrates an example of a process taken by an access point for an implementation using a doze page to a low power receiver to deactivate a primary receiver.
FIG. 16B shows a series of steps taken by a station for an example implementation using a doze page to a low power receiver to deactivate a primary receiver.
Figure 17:
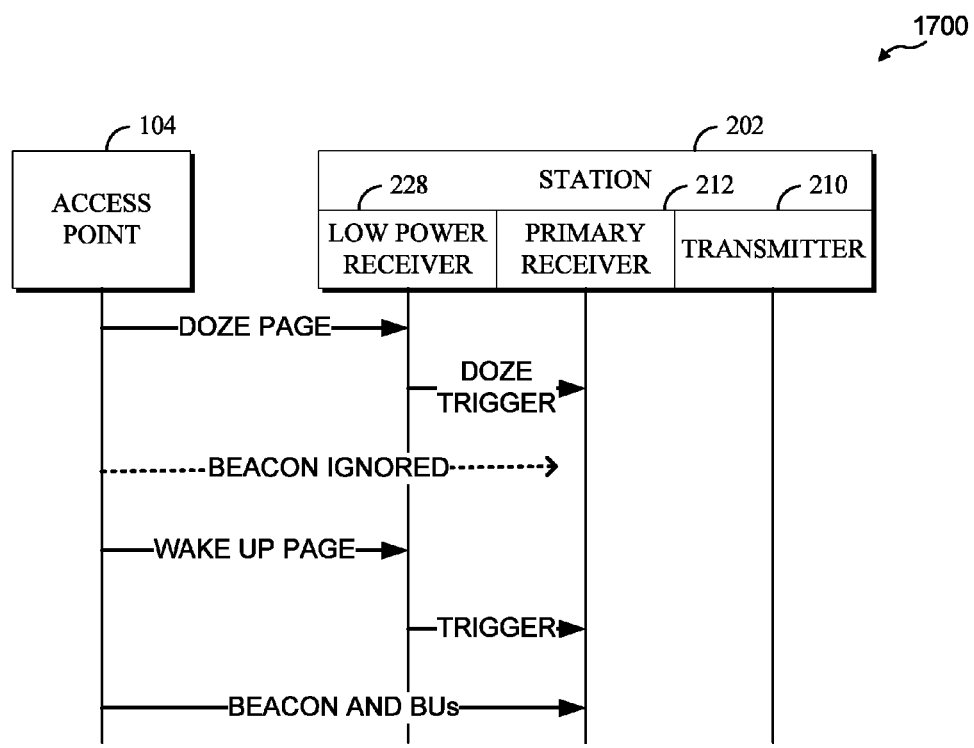
FIG. 17 shows a sequence diagram for an example implementation using a doze page to a low power receiver to deactivate a primary receiver.

FIGS. 16A, 16B, and 17 show a possible implementation of near passive receivers to conserve power consumption. FIG. 16A illustrates a process 1600*a* of a transmitting device, for example AP 104. FIG. 16B illustrates a process 1600*b* of a device, for example STA 106. FIG. 17 illustrates a sequence 1700 of the interaction between a transmitting device and a receiving device. In this example, the AP transmits deactivation or doze page at block 1602*a*. The STA receives this page at block 1602*b*, and deactivates the primary receiver at block 1604*b*. The primary receiver, when in a doze state, doesn't receive beacons or other transmissions unless it's reactivated. Sequence 1700 shows these interactions, with an example where a subsequent wake-up page triggers reactivation of the primary receiver.

Figure 18:
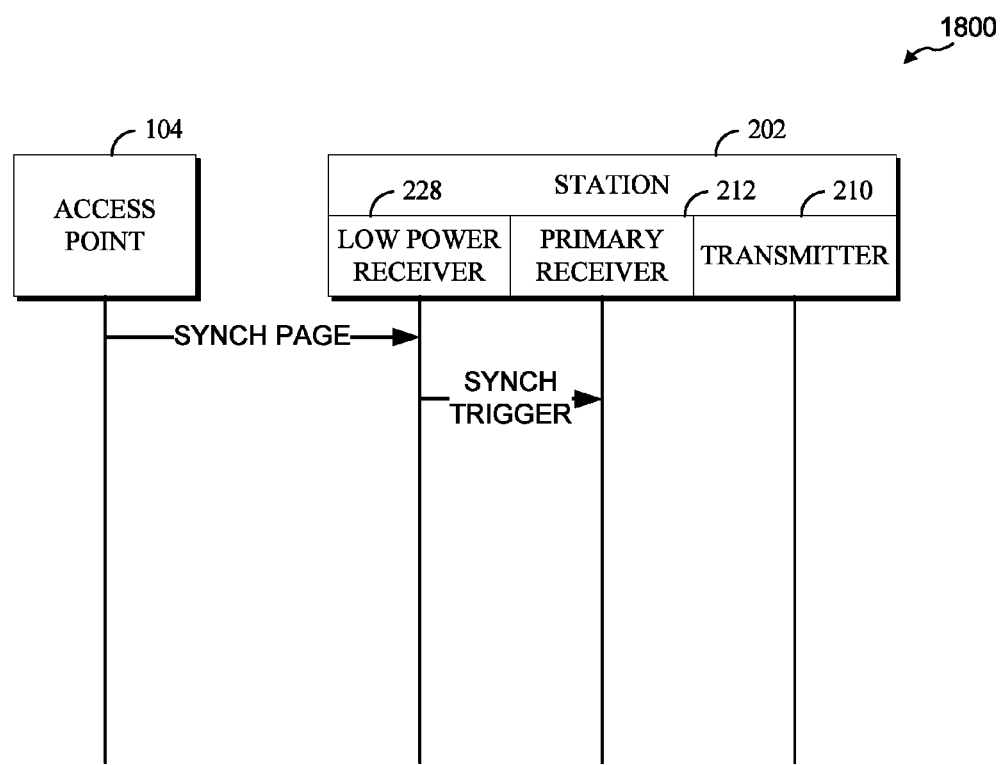
FIG. 18 shows a sequence diagram for an example implementation using a synch page to a low power receiver for synchronization between the access point and station.

FIG. 18 shows the series of transactions for an implementation where the page is a neither a wake-up page nor a doze page. In this case, the AP 104 sends a synch page that is received by the low power receiver 228 of wireless device STA 202. This synchronization can be used to synch timing with the primary receiver 212, or other components (not shown) of the STA.

Figure 19:
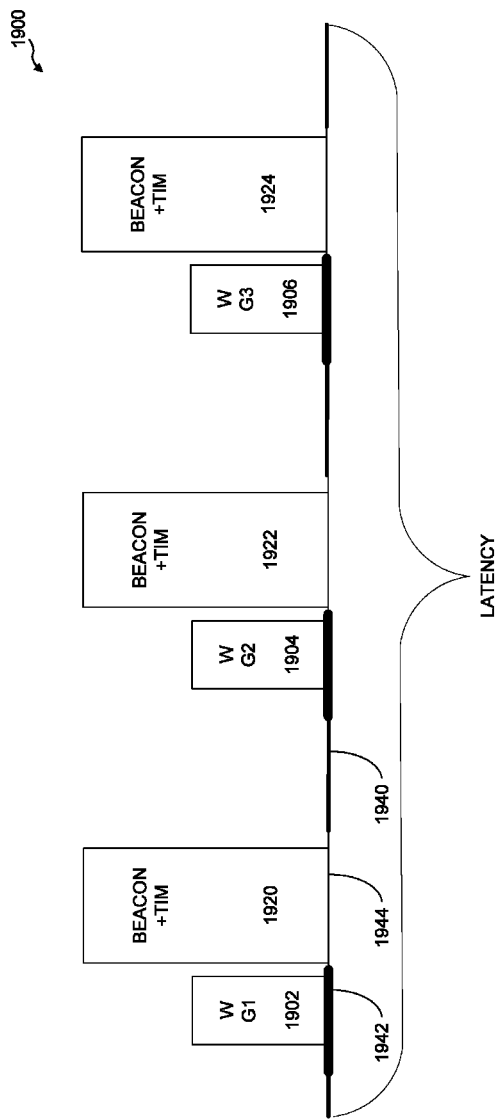
FIG. 19 shows an example power saving implementation in which the AP groups sensors, and sends wake-up pages for each subset at distinct times followed by a Beacon and TIM for each group.

FIG. 19 shows an example power saving implementation in which the AP groups sensors, and sends wake-up pages for each subset at distinct times followed by a Beacon and TIM for each group. For this implementation, the AP may send a wake-up page to each group in turn. FIG. 19 illustrates an example 1900 with three groups, G1, G2, and G3, with wake-up pages 1902, 1904, and 1906 sent at distinct times within each latency period. Different power management states are shown in example 1900 on the timeline, with a first state 1944 when the primary receiver is in awake state, a second state 1942 when the primary receiver is in doze state but the low power receiver is in page awake state, and a third state 1940 when both receivers are in doze state. The wake-up message may follow the Traffic Identification Map (TIM) defined per group. Transmissions may be sent using unicast, groupcast, multicast, or broadcast mechanisms. For this example, potentially fewer bits are required to wake up a unique address. Other implementations have the potential use the medium more efficiently as in this approach, more beacons are transmitted than might be necessary, and some intervals might not be used.

Figure 20:
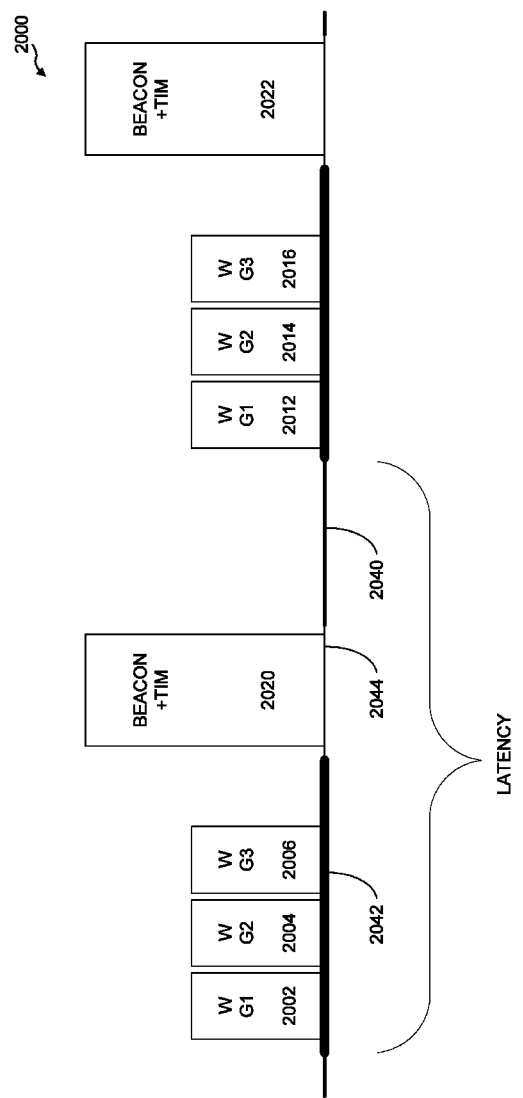
FIG. 20 shows an example power saving implementation in which the AP groups sensors, and sends wake-up pages before the traffic identification map (TIM), starting from a given time.

FIG. 20 shows an example power saving implementation 2000 in which the AP groups sensors, and sends wake-up pages before the traffic identification map (TIM), starting from a given time. Unlike the approach illustrated in FIG. 19, all STAs may follow the same TIM interval. The beacon and TIM timeframes are typically common for multiple groups. The example 2000 shows wake-up pages 2002, 2004, and 2006 for groups 1, 2, and 3, respectively, in the first latency period preceding beacon and TIM 2020. This pattern typically repeats in subsequent latency periods. Different power management states are shown in example 2000 on the timeline, with a first state 2044 when the primary receiver is in awake state, a second state 2042 when the primary receiver is in doze state but the low power receiver is in page awake state, and a third state 2040 when both receivers are in doze state. For some implementations, the AP uses unicast wake-up pages. In these cases, the page timing might impinge on the beacon interval. This option has the advantage more efficient use of the medium but there may be many sequential wakeup pages before the beacon if there are many groups.

Figure 21:
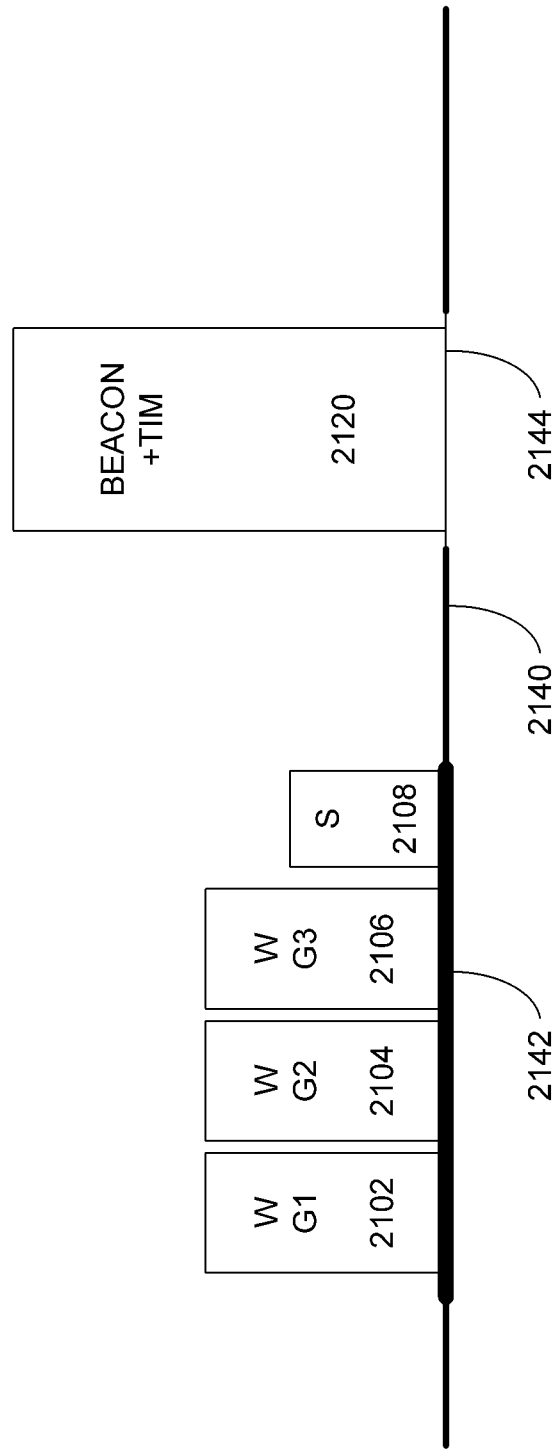
FIG. 21 shows an example power saving implementation in which the AP groups sensors, and sends wake-up pages before the traffic identification map (TIM), starting from a given time, and where a sleep page terminates the wakeup receiving procedure.

FIG. 21 shows an example power saving implementation in which the AP groups sensors, and sends wake-up pages before the traffic identification map (TIM), starting from a given time, and where a sleep page terminates the wakeup receiving procedure. The implementation illustrated in FIG. 21 is a variation of the implementation in FIG. 20. For some implementations, the wake pages (2102, 2104, and 2106 as an example in FIG. 21) are followed by sleep packet that terminates the wakeup page receiving procedure. Once the low power receiver receives sleep page 2108, the primary receiver may transition to doze state 2140, until it's time to transition back to awake state 2144 and receive beacon 2120. In some implementations, the wakeup page time may be transmitted well in advance of the beacon.

Figure 22:
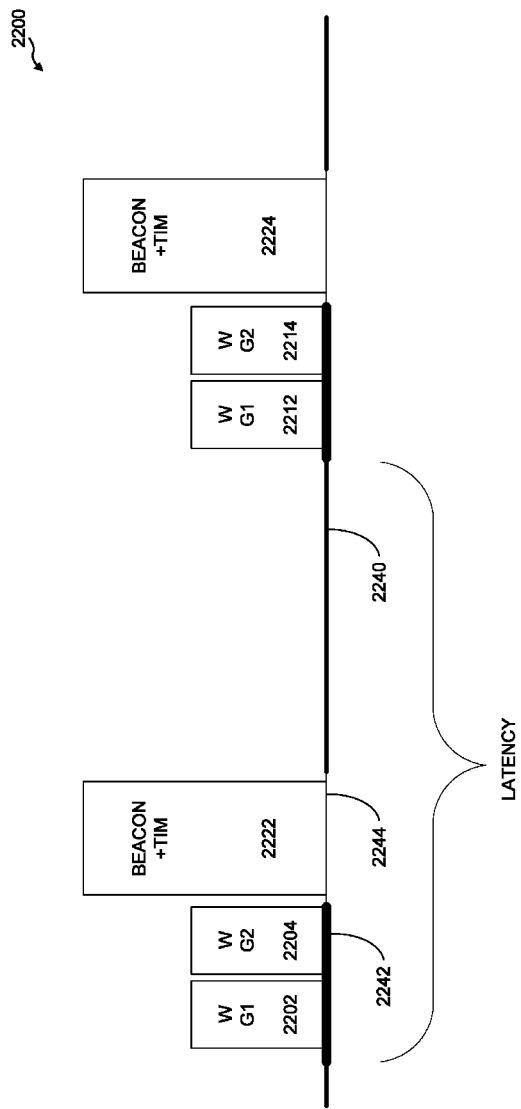
FIG. 22 shows an example power saving implementation in which the AP groups sensors, and sends a limited number of wake-up pages before each beacon.

FIG. 22 shows another possible implementation, with a limited number of wakeup messages before each beacon. This is similar to the option in FIG. 20. For some implementations, there are at most K wake up pages (2202, 2204 in the first latency period, and 2212, 2214 for the next period depicted in the example). The number of wake up messages typically depends on the number of STAs paged and the number of available bits in the wake message. The AP sends K wake messages. Paging may be sent using unicast, multicast, or broadcast in different implementations. The AP may optimize the choice of transmission method.

Each beacon period starts with a TIM if needed. TIM is typically required for large groups. For small groups, a PS-poll usually suffices. Unicast transmissions don't require a TIM. FIG. 22 depicts wake up pages 2202 and 2204 in the first latency period before beacon 2222 is transmitted. Different power management states are shown in example 2200 on the timeline, with a first state 2244 when the primary receiver is in awake state, a second state 2242 when the primary receiver is in doze state but the low power receiver is in page awake state, and a third state 2240 when both receivers are in doze state.

Figure 23:
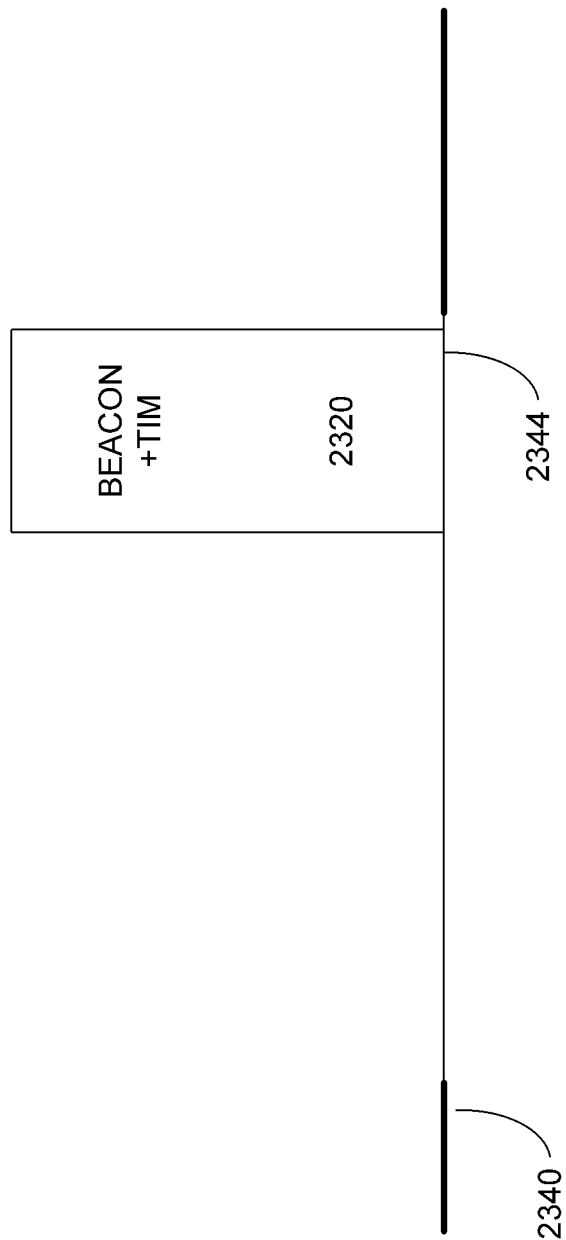
FIG. 23 shows that implementations without a low power receiver that doesn't receive sleep packets, and the primary receiver doesn't ignore beacons.
Figure 24:
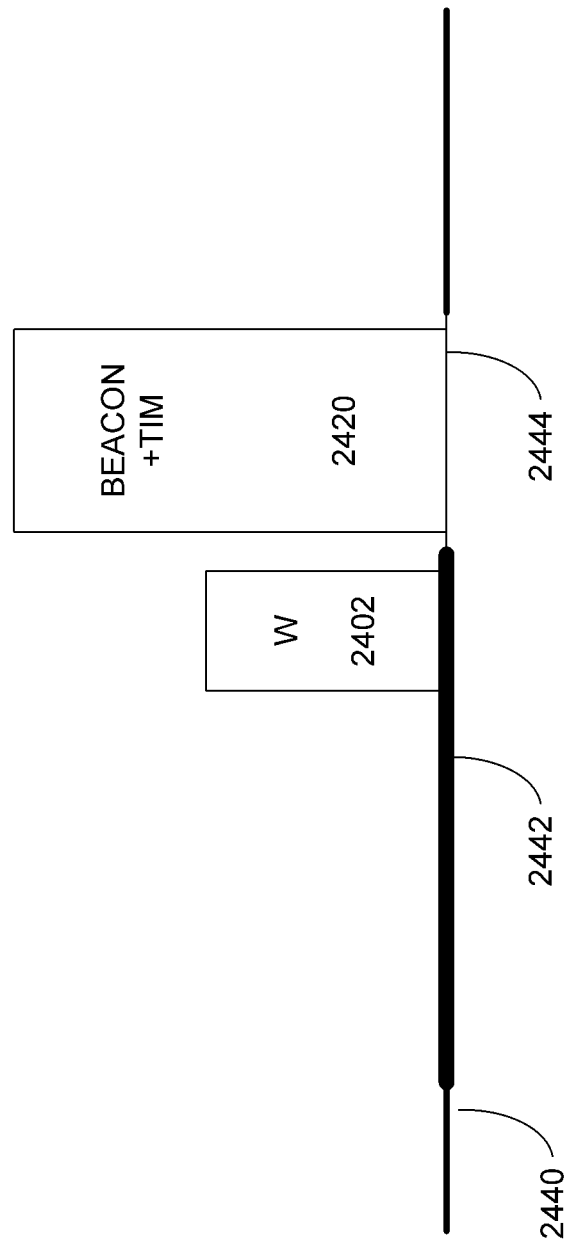
FIG. 24 shows that implementations with a low power receiver that receives a wake up page before a beacon receives that beacon.
Figure 25:
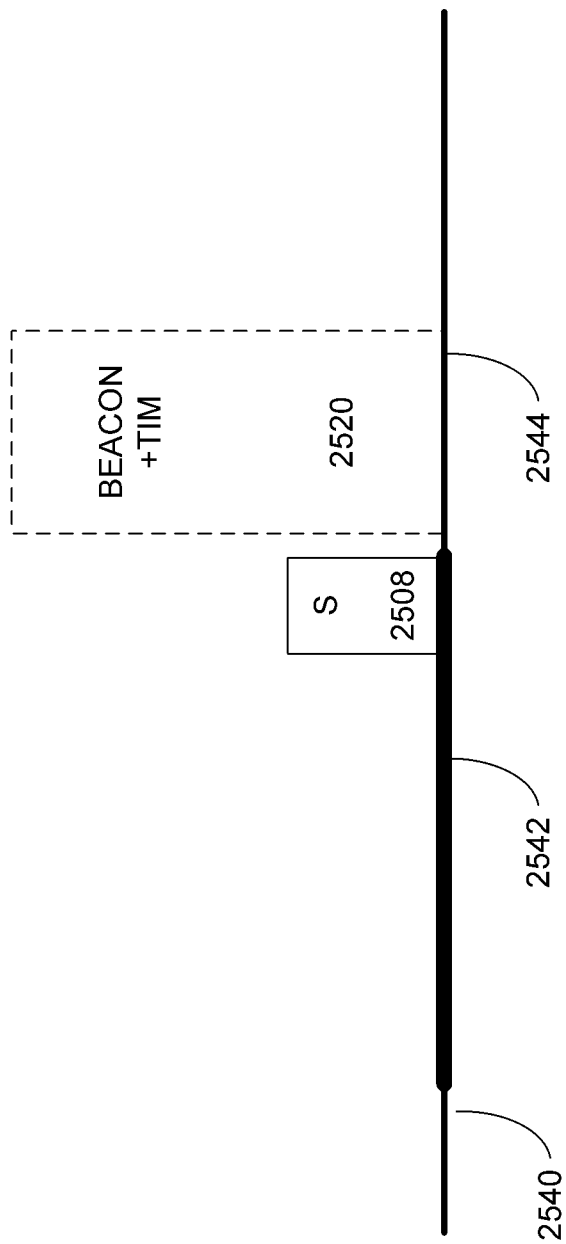
FIG. 25 shows that implementations with a low power receiver that receives a sleep page before a beacon ignores that beacon.

FIGS. 23, 24, and 25 illustrate sleep packets in use during normal Power Save mode, when STAs often listen to beacons because of low latency requirements, but no data is sent. By sending sleep packets, primary receivers may be transitioned to doze state so that beacons would not be received, to reduce power consumption. FIG. 23 shows that if there is no low power receiver, power may not be saved because primary receivers receive beacons 2320 whether or not there are BUs or messages for them. The primary receiver remains in active state 2344. In FIG. 24, the low power receiver receives wakeup page 2402 during page awake state 2442, and the primary receiver receives beacon 2420 as it's in awake state 2444 when the beacon is received. In FIG. 25, the low power receiver receives a sleep page 2508 while in page awake state 2542, and in response to the sleep page, the STA transitions the low power receiver to doze state 2544, the beacon is not received, and power is conserved.

As described earlier, in some implementations, the STA communicates with the AP to determine a Target Wakeup Time (TWT). The STA also indicates to the AP whether, at the TWT, the STA would like to receive a short paging message (e.g., an NDP control frame), by including an optional NP field in a TWT information element and filing its subfield (as to be described in detail below). The paging message can indicate whether there are any buffered units at the AP for the STA, by putting the one of P-IDs of the station in the P-ID field of an NDP paging frame (as will be described in detail below). The STA can send a Management frame to the AP including the above requests and any other parameter that may be required, such as a suggested time for the TWT. If the STA requested that a short paging be sent, and if data is pending, the AP sends a short paging message directed to the STA, at a Target Wakeup Time.

Figure 26A:
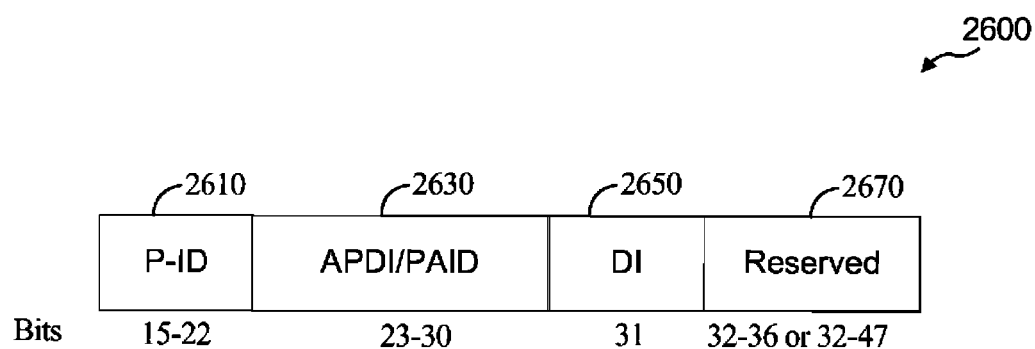
FIG. 26A shows a structure of an exemplary NDP control frame in accordance with an embodiment of the invention.

FIG. 26A shows a structure of an exemplary NDP control frame 2600 in accordance with an embodiment of the invention. The NDP control frame 2600 (also referred to as the NDP paging frame) includes a P-ID field 2610, which is an identifier of the paged station. The DI field 2650 is a direction identifier. In certain implementations, if the NDP paging frame is sent by a non-AP station to an AP, then the DI field shall be set to 1. If the NDP paging frame is sent by an AP, then the DI field should be set to 0. A field 2670 is reserved. Depending on whether the communication uses a bandwidth of 1 or 2 MHz, the field 2670 can include either the 32nd to 36th bits or the 32nd to 47th bits respectively. The APDI/PAID field 2630 is set to either APDI or PAID, depending on the value of the DI field. If the DI field is set to 1, the APDI/PAID field is set to PAID (Transmitter Partial AID), which is set to the PAID of the transmitter non-AP station. If the DI field is set to 0, the APDI/PAID field is set to APDI.

In one implementation, the DI field may be set to 1 from one direction only and 0 on the other direction. The DI field may be set to 1 or 0 for both directions, or may be set to 0 based on station agreements. The DI field may be set in a random fashion or as indicated by a timer.

Figure 26B:
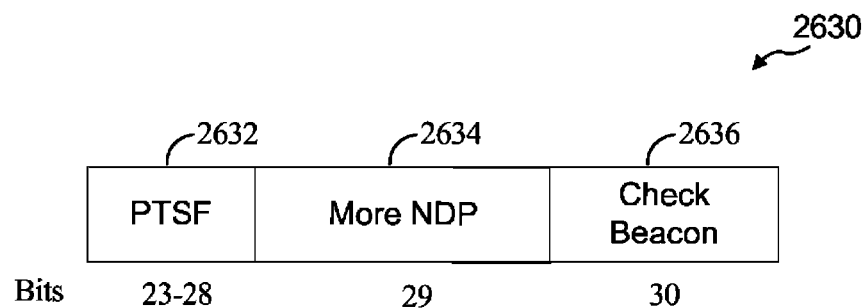
FIG. 26B shows an exemplary structure of the APDI field from FIG. 26A in accordance with an embodiment of the invention.

FIG. 26B shows an exemplary structure of the APDI field 2630 from FIG. 26A in accordance with an embodiment of the invention. The APDI field 2630 has a PTSF field 2632, which includes the partial TSF of the transmitting station. A Check Beacon bit 2636 indicates changes in the beacon. A More NDP field 2634 is set to one if the NDP Paging frame is followed by another NDP Paging frame.

Figure 27A:
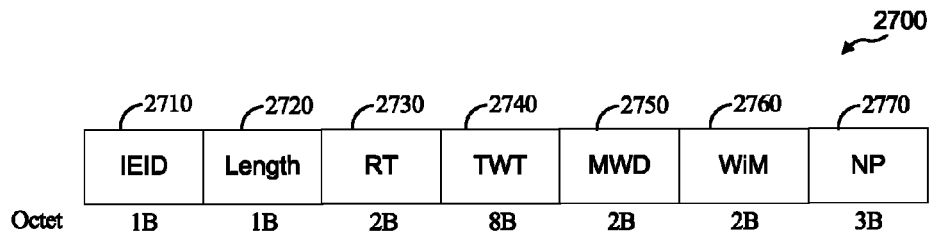
FIG. 27A shows a structure of an exemplary TWT information element used to determine a TWT NDP in accordance with an embodiment of the invention.

FIG. 27A shows a structure of an exemplary TWT information element 2700 used to determine a TWT NDP in accordance with an embodiment of the invention. The TWF information element 2700 includes an IEID field 2710 indicating the identification for the information element. A length field 2720 indicates the length of the information element. A RT field 2730 indicates the request type. A TWT field 2740 indicates the target wake time. A MWD field 2750 indicates the minimum wake duration. A WiM field 2760 indicates the wake interval Mantissa for required wake interval for indicated duration. In one implementation, all fields of the TWT information element 2700 except the NP field 2770 are as defined in the 802.11ah standard. In one implementation, the length field indicates the presence of the NP field 1370 if the Length field is set to a particular value (e.g. a value greater than 16).

Figure 27B:
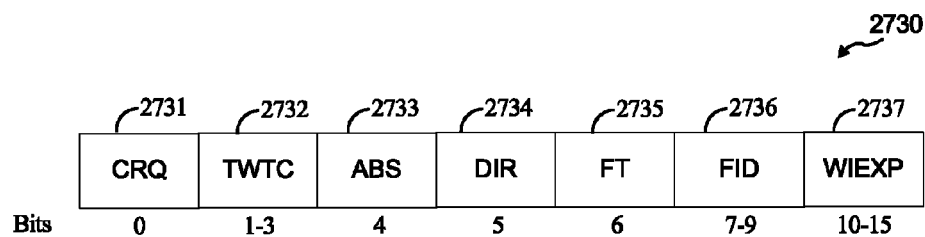
FIG. 27B shows a structure of an exemplary RT field.

FIG. 27B shows a structure of an exemplary RT field 2730. In one implementation, the RT field 2730 is as defined in the 802.11ah standard. The RT field 2730 includes a CRQ field 2731, which is set to 0 for an AP response, and to 1 for a client request. A TWTC field 2732 uses different values to represent different TWT commands as listed below.
    000b=client NULL suggestion (let AP choose wake time)
    001b=client suggestion, AP accepts client suggestion
    010b=client demand, AP accepts client demand
    011b=Reserved
    100b=Reserved
    101b=AP alternative suggestion
    110b=AP alternative demand
    111b=AP Rejects TWT setup An ABS field 2733 indicates whether a TSF is a relative value (when set to 0) or an absolute value (when set to 1). A DIR field 2734 indicates the flow direction. For example, the value can be set to 0 for a direction from a station to AP and to 1 for a direction from an AP to a station. A FT field 2735 indicates the flow type. The FT field is set to 0 if the flow is request-driven or to 1 if no request is necessary. A FID field 2736 is an identifier for the flow identification. A WIEXP field 2737 indicates the value of an exponent to the applied to the wake interval. Thus, WI=WiM×2^WIEXP.

Figure 27C:
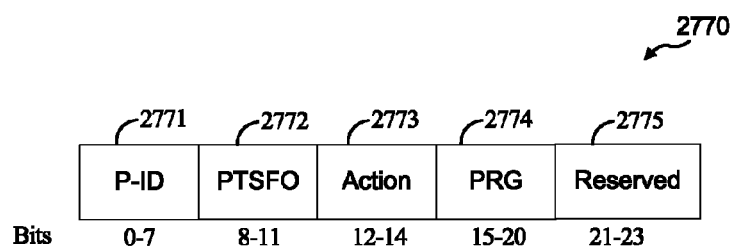
FIG. 27C shows an exemplary format for the NP field from FIG. 27A in accordance with an embodiment of the invention.

FIG. 27C shows an exemplary format for the NP field 2770 from FIG. 27A in accordance with an embodiment of the invention. In certain implementations, the NP field 2770 includes a P-ID field 2771 which indicates the paging identification. A PTSFO field 2772 indicates the partial TSF offset such as one described in 802.11ah standard. An Action field 2773 defines the action of the station upon reception of an NDP paging frame with the P-ID field matching the P-ID field in NP field in the respond TWT IE in the setup phase of NDP paging. Different values of the Action field represent different actions as listed below.
    0=Send a PS-Poll
    1=Wait for packet reception
    2=STA receives the Beacon
    3=STA receives the delivery traffic indication message (DTIM) Beacon
    4-7=reserved A PRG field 2774 indicates the offset time a station is capable of receiving other types of packets other than NDP paging. The offset is computed as the units of SIFS. In one implementation, the Bit number 15 of the NP field may be reserved.

In one implementation, the NDP paging may be set up using the NDP paging frame 2600 (shown in FIG. 26A) and the TWT IE 2700 (shown in FIG. 27A) as described below. Some of the procedures as described below may be as defined in 802.11ah standard.

To set up the NDP page, a non-AP station may send one or more TWT IE 2700 with the NP field present and the CRQ field set to 1 to a recipient station, in which case the P-ID field is set to one of its assigned AIDs and the Action frame is reserved. In addition, an AP may send one or more TWT IE 2700 with NP field present and the CRQ field set to 1 to a recipient station, in which case the P-ID field may be set to any value.

Upon receiving a NDP paging IE request, the recipient station shall respond with a TWT IE 2700 with the CRQ field set to 0 and the NP field present. A station sending a response to an AP should set the P-ID to the same value as the P-ID from the request. A station sending a response to a non-AP station should set the P-ID to the same value as the P-ID from the request. Responder should also set the Action field. The PTSFO field in response is reserved. In certain implementations, the action the station performs upon receiving a value of the Action field is listed here:
    Action field=0: STA shall send the PS-Poll
    Action field=1: STA shall be able to receive any packet types after PRG units of SIFS after the end of reception of the NDP Paging frame
    Action field=2: STA shall receive the next Beacon or Short Beacon that happens in the TBTT after PRG units of SIFS after the end of reception of the NDP Paging frame
    Action field=3: STA shall receive the next DTIM that happens after PRG units of SIFS after the end of reception of the NDP Paging frame A station sending a response shall schedule an NDP Paging frame as the next frame for transmission at the time indicated by the TWT field in the response if one of the following conditions are satisfies:
    There are buffered units (Bus) intended for the AP.
    There are BUs intended for the non-AP station with the AID indicated in the request.
    There is a critical update to the Beacon has occurred.

If the NDP Paging frame is sent by a non-AP station to an AP, then the DI field shall be set to 1. If the NDP Paging frame is sent by an AP, then DI field shall be set to 0.

The P-ID field of the NDP Paging frame shall be set to the P-ID field in TWT response if there are BUs for the requestor station. The P-ID field of NDP Paging frame shall not be set to the P-ID field of TWT response if there are no BUs for the requestor station. In one implementation, a P-ID value of all zeros can be used for broadcast information.

A station sending a request and receiving a response shall read the next DTIM if it receives an NDP Paging with the P-ID set to all zeros and the Check Beacon not changed (the same as advertised at least once before.)

In the NDP Paging frame, if the DI field is set to 1, the PAID field in the NDP Paging frame shall be set to the PAID of the transmitter non-AP STA. In the NDP Paging frame, if the DI field is set to 0, the APDI field in the NDP Paging frame shall be set as follows:

The PTSF field is set to TSF [e.g., PTSFO+4:PTSFO+9], where TSF is the 8 bytes value of the TSF and PTSFO is the value of the PTSFO field in the TWT request.

The Check Beacon field is initialized to 0 and incremented when a critical update to the Beacon frame has occurred. If a Broadcast TIM is used, and no critical update to the Beacon frame occurred in the time between the transmission of an NDP Control frame and a TIM Broadcast frame, then the value of the Check Beacon field in the Paging request frame shall be same as the LSB of the Check Beacon field in the TIM Broadcast frame.

More NDP is set if there is one NDP paging frame following after SIFS time

A station sending a request and receiving a response may ignore any frames sent to it during the time indicated by the minimum awake time field in TWT IE response other than frame type NDP Paging. A station sending a request and receiving a response which is being paged by NDP Paging frame, may ignore any frames sent to it from the end of the NDP Paging frame for the duration indicated by the PRG field in TWT IE in units of SIFS.

An STA sending a request and receiving a response shall extend the minimum awake duration to receive the next NDP Paging frame if the More NDP bit is set to 1. An STA sending a request and receiving a response shall receive the Beacon or Short Beacon frame at the next target beacon transit time (TBTT) if it receives any NDP Paging with the Check Beacon bit value different from what previously received.

If a paged station is interested in time sync with a pager station, the pager station should set the DI bit to 0 and set the PTSF field to the correct value. If the paged station may be paged by different pager stations, the pager should set the DI bit to 1 to indicate its identify by putting it PAID in the PAID field.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
    a first receiver configured to receive a paging message from a first device, the paging message configured in a null data packet (NDP) format and comprising a paging identification (P-ID) field and a direction identifier (DI) field, the P-ID field indicating an identifier of the first device, the DI field indicating whether the first device is an access point or a non-access point device;
    a processor configured to decode the paging message; and
    a second receiver configured to receive a beacon signal based on the paging message,
    wherein the processor is configured to transition the second receiver to an awake state via a trigger signal based on the paging message, wherein the second receiver is further configured to receive the beacon signal after the transition to the awake state, the first receiver further configured to, when in an awake state, consume less power than the second receiver when in an awake state.

2. The apparatus of claim 1, wherein the paging message is received at a periodic interval.

3. The apparatus of claim 1, wherein the paging message has fewer bits than a beacon signal.

4. The apparatus of claim 1, wherein the paging message further comprises a third field indicating an access point direction information (APDI) field or a partial association identifier (PAID) field based on a value of the DI field.

5. The apparatus of claim 4, wherein the APDI field comprises a partial time synchronization function (PTSF) field indicating a PTSF of the first device.

6. The apparatus of claim 1, wherein the first receiver is further configured to receive a beacon signal based on the paging message.

7. The apparatus of claim 1, further comprising a transmitter configured to send an acknowledgement that the paging message was received.

8. The apparatus of claim 1, further comprising a transmitter configured to send a power save poll (PS-Poll) frame to notify the first device that it is awake and polls for downlink data.

9. The apparatus of claim 1, wherein the processor is further configured to transition the second receiver to the awake state at a specified time.

10. The apparatus of claim 9, wherein the specified time corresponds to a next target beacon transit time to receive a regular beacon.

11. The apparatus of claim 1, wherein the processor is further configured transition the first receiver to a doze state.

12. The apparatus of claim 1, wherein the second receiver is further configured to transition to a doze state.

13. The apparatus of claim 1, further comprising a transmitter configured to transmit a request indicating the apparatus wants to receive the paging message.

14. The apparatus of claim 13, wherein the request comprises a target wake time (TWT) IE (information element).

15. The apparatus of claim 14, wherein the TWT IE comprises a notification period (NP) field.

16. The apparatus of claim 15, wherein the NP field comprises a paging identification (P-ID) field which indicates a paging identification.

17. The apparatus of claim 16, wherein the P-ID field of the request indicates a partial association identifier (PAID) assigned by the first device.

18. The apparatus of claim 16, wherein the P-ID field of the request indicates a partial basic service set identifier.

19. The apparatus of claim 1, wherein the paging message includes messaging instructions.

20. The apparatus of claim 1, wherein the second receiver consumes more power than the first receiver when the first and second receivers are in an active state, wherein said more power is about five times (5×) more power, ten times (10×) more power, twenty times (20×) more power, fifty times (50×) more power, one hundred times (100×) more power, or two hundred times (200×) more power.

21. The apparatus of claim 1, wherein the paging message comprises one or more of an association ID, a group ID, and a buffered units indication.

22. The apparatus of claim 6, wherein the beacon signal comprises information indicating that the apparatus will receive paging messages.

23. The apparatus of claim 1, wherein the beacon signal comprises information indicating that the apparatus will receive paging messages.

24. The apparatus of claim 1, further comprising a transmitter configured to send a target wake time (TWT) IE (information element) to set up NDP Paging time intervals.

25. The apparatus of claim 24, wherein the TWT IE comprises at least one of an information element identifier (IEID) field indicating an identification for the information element, a request type (RT) field indicating the request type, a TWT field indicating a target wake time, a minimum wake duration (MWD) field indicating a minimum wake duration and a wake interval Mantissa (WiM) field indicating a wake interval Mantissa for required wake interval for indicated duration.

26. The apparatus of claim 24, wherein the TWT IE comprises a notification period (NP) field.

27. The apparatus of claim 26, wherein the TWT IE comprises a length field indicating a presence of the NP field if the length field is set to a particular value.

28. The apparatus of claim 26, wherein the NP field comprises a paging identification (P-ID) field which indicates the paging identification.

29. The apparatus of claim 26, wherein the NP field comprises a partial time synchronization function (TSF) offset (PTSFO) field indicating a partial TSF offset.

30. The apparatus of claim 26, wherein the NP field comprises an action field which defines the action of the apparatus.

31. The apparatus of claim 30, wherein the action defined by the action field is for the transmitter to send a power save poll (PS-Poll).

32. The apparatus of claim 30, wherein the action defined by the action field is for the apparatus to wait for a packet reception.

33. The apparatus of claim 30, wherein the action defined by the action field is for the apparatus to wake-up and wait to receive the beacon signal.

34. The apparatus of claim 30, wherein the action defined by the action field is for the apparatus to wake-up and receive a delivery traffic indication message Beacon.

35. The apparatus of claim 26, wherein the NP field comprises a field indicating an offset time the apparatus is capable of receiving other types of packets.

36. The apparatus of claim 26, wherein the offset is computed as the units of short interframe space (SIFS).

37. The apparatus of claim 36, wherein the NP field comprises a reserve bit, the reserve bit being the 15 bit in the NP field.

38. An apparatus for wireless communication, comprising:
first means for receiving a paging message from a first device, the paging message configured in a null data packet (NDP) format and comprising a paging identification (P-ID) field and a direction identifier (DI) field, the P-ID field indicating an identifier of the first device, the DI field indicating whether the first device is an access point or a non-access point device;
means for decoding the paging message;
second means for receiving a beacon signal based on the paging message; and
means for transitioning the second receiving means to an awake state based on the paging message, wherein the second means for receiving comprises means for receiving the beacon signal after the transition to the awake state, the first means for receiving, when in an awake state, consuming less power than the second receiving means when in an awake state.

39. The apparatus of claim 38, wherein the paging message is received at a periodic interval.

40. The apparatus of claim 38, wherein the paging message is smaller than a beacon signal.

41. The apparatus of claim 38, wherein the paging message further comprises a third field indicating an access point direction information (APDI) field or a partial association identifier (PAID) field based on a value of the DI field.

42. The apparatus of claim 41, wherein the APDI field comprises a partial time synchronization function (PTSF) field indicating a PTSF of the first device.

43. The apparatus of claim 38, wherein the first means for receiving comprises a first receiver, wherein the second means for receiving comprises a second receiver.

44. The apparatus of claim 38, further comprising means for sending an acknowledgement to the first device that the paging message was received.

45. The apparatus of claim 38, wherein the means for transitioning comprises means for transitioning the second receiving means to an awake state at a specified time.

46. The apparatus of claim 45, wherein the specified time corresponds to a next target beacon transit time to receive the beacon signal.

47. The apparatus of claim 38, further comprising means for transitioning the second receiving means to a doze state.

48. The apparatus of claim 43, wherein the second receiver transitions to a doze state.

49. The apparatus of claim 38, further comprising means for transmitting a request indicating the apparatus wants to receive the paging message.

50. The apparatus of claim 49, wherein the request comprises a target wake time (TWT) IE (information element).

51. The apparatus of claim 50, wherein the TWT IE comprises a notification period (NP) field.

52. The apparatus of claim 51, wherein the NP field comprises a paging identification (P-ID) field which indicates a paging identification.

53. The apparatus of claim 52, wherein the P-ID field of the request indicates a partial association identifier (PAID) assigned by the first device.

54. The apparatus of claim 52, wherein the P-ID field of the request indicates a partial basic service set identifier.

55. The apparatus of claim 38, wherein the paging message includes synchronization information.

56. The apparatus of claim 38, wherein the paging message includes communications medium status information.

57. The apparatus of claim 38, wherein the paging message includes messaging instructions.

58. The apparatus of claim 43, wherein the second receiver consumes greater than at least one of about five times (5×) more power than the first receiver when the first and second receivers are in an active state, about ten times (10×) more power than the first receiver when the first and second receivers are in an active state, about twenty times (20×) more power than the first receiver when the first and second receivers are in an active state, about fifty times (50×) more power than the first receiver when the first and second receivers are in an active state, about one hundred times (100×) more power than the first receiver when the first and second receivers are in an active state and about two hundred times (200×) more power than the first receiver when the first and second receivers are in an active state.

59. The apparatus of claim 38, wherein the paging message comprises one or more of association ID, a group ID, and a buffered units indication.

60. The apparatus of claim 47, wherein the means for transitioning the second receiving means comprises means for transitioning the second receiving means to the doze state at a specific time.

61. The apparatus of claim 38, wherein the signal comprises information indicating that the apparatus will receive paging messages.

62. A method for wireless communication, comprising:
receiving, via a first receiver at a first device, a paging message from a second device, the paging message configured in a null data packet (NDP) format and comprising a paging identification (P-ID) field and a direction identifier (DI) field, the P-ID field indicating an identifier of the second device, the DI field indicating whether the second device is an access point or a non-access point device;
decoding the paging message;
receiving a beacon signal based on the paging message, wherein receiving the beacon signal comprises receiving the beacon signal via a second receiver; and
transitioning the second receiver to an awake state based on the paging message, wherein receiving the beacon signal comprises receiving the beacon signal after the transition to the awake state, the first receiver, when in an awake state, consuming less power than the second receiver when in an awake state.

63. The method of claim 62, wherein the paging message is received at a periodic interval.

64. The method of claim 62, wherein the paging message is smaller than a beacon signal.

65. The method of claim 62, wherein the paging message further comprises a third field indicating an access point direction information (APDI) field or a partial association identifier (PAID) field based on a value of the DI field.

66. The method of claim 65, wherein the APDI field comprises a partial time synchronization function (PTSF) field indicating a PTSF of the second device.

67. The method of claim 62, further comprising receiving a beacon signal based on the paging message.

68. The method of claim 62, further comprising transmitting an acknowledgement to the second device that the paging message was received.

69. The method of claim 62, wherein transitioning the second receiver comprises transitioning the second receiver to an awake state at a specified time.

70. The method of claim 69, wherein the specified time corresponds to a next target beacon transit time to receive the beacon signal.

71. The method of claim 62, further comprising transitioning the second receiver to a doze state at a specified time.

72. The method of claim 62, further comprising transmitting a request indicating the first device wants to receive the paging message.

73. The method of claim 72, wherein the request comprises a target wake time (TWT) IE (information element).

74. The method of claim 73, wherein the TWT IE comprises a notification period (NP) field.

75. The method of claim 74, wherein the NP field comprises a paging identification (P-ID) field which indicates a paging identification.

76. The method of claim 75, wherein the P-ID field of the request indicates a partial association identifier (PAID) assigned by the first device.

77. The method of claim 75, wherein the P-ID field of the request indicates a partial basic service set identifier.

78. The method of claim 62, wherein the paging message includes messaging instructions.

79. The method of claim 62, wherein the second receiver consumes greater than at least one of about five times (5×) more power than the first receiver when the first and second receivers are in an active state, about ten times (10×) more power than the first receiver when the first and second receivers are in an active state, about twenty times (20×) more power than the first receiver when the first and second receivers are in an active state, about fifty times (50×) more power than the first receiver when the first and second receivers are in an active state, about one hundred times (100×) more power than the first receiver when the first and second receivers are in an active state and about two hundred times (200×) more power than the first receiver when the first and second receivers are in an active state.

80. The method of claim 62, wherein the paging message comprises one or more of association ID, a group ID, and a buffered units indication.

81. The method of claim 62, wherein the paging message includes communications medium status information.

82. The method of claim 62, wherein the beacon signal comprises information indicating that the first device will receive paging messages.

83. A computer program product comprising a non-transitory computer readable medium encoded thereon with instructions that when executed cause a wireless communications apparatus to perform a method of wireless communication, said method comprising:
receiving, via a first receiver, a paging message from a first device, the paging message configured in a null data packet (NDP) format and comprising a paging identification (P-ID) field and a direction identifier (DI) field, the P-ID field indicating an identifier of the first device, the DI field indicating whether the first device is an access point or a non-access point device;
decoding the paging message;
receiving a beacon signal based on the paging message, wherein receiving the beacon signal comprises receiving the beacon signal via a second receiver; and
transitioning the second receiver to an awake state based on the paging message, wherein receiving the beacon signal comprises receiving the beacon signal after the transition to the awake state, the first receiver, when in an awake state, consuming less power than the second receiver when in an awake state.

* * * * *